(12) United States Patent
Sikdar

(10) Patent No.: US 7,154,902 B1
(45) Date of Patent: Dec. 26, 2006

(54) EPOCH-BASED PACKET SWITCHING

(75) Inventor: Somsubhra Sikdar, San Jose, CA (US)

(73) Assignee: Force10 Networks, Inc., San Jose, CA (US)

( * ) Notice: Subject to any disclaimer, the term of this patent is extended or adjusted under 35 U.S.C. 154(b) by 1054 days.

(21) Appl. No.: 10/277,577

(22) Filed: Oct. 21, 2002

(51) Int. Cl.
*H04L 12/28* (2006.01)

(52) U.S. Cl. ...................... 370/412; 370/230; 370/235; 370/401

(58) Field of Classification Search ...................... None
See application file for complete search history.

(56) References Cited

U.S. PATENT DOCUMENTS

| | | | | |
|---|---|---|---|---|
| 5,166,930 A | * | 11/1992 | Braff et al. | 370/235 |
| 6,067,301 A | * | 5/2000 | Aatresh | 370/418 |
| 6,351,466 B1 | * | 2/2002 | Prabhakar et al. | 370/413 |
| 6,757,246 B1 | * | 6/2004 | Alasti et al. | 370/230 |
| 6,813,274 B1 | * | 11/2004 | Suzuki et al. | 370/412 |
| 6,963,576 B1 | * | 11/2005 | Lee | 370/411 |
| 6,975,638 B1 | * | 12/2005 | Chen et al. | 370/412 |
| 6,977,935 B1 | * | 12/2005 | Kamiya et al. | 370/395.4 |
| 7,023,840 B1 | * | 4/2006 | Golla et al. | 370/360 |
| 7,099,275 B1 | * | 8/2006 | Sarkinen et al. | 370/230 |
| 2001/0038629 A1 | * | 11/2001 | Shinohara | 370/394 |
| 2002/0048280 A1 | * | 4/2002 | Lee et al. | 370/468 |

* cited by examiner

*Primary Examiner*—Bob A. Phunkulh
(74) *Attorney, Agent, or Firm*—Haynes and Boone, LLP

(57) ABSTRACT

A high-speed router and method for operation of the core of such a router are disclosed. A switch fabric serves a plurality of ingress and egress ports. Packets are sorted into queues at each ingress port, each queue corresponding to one of the egress ports. Queue status information for each ingress port is communicated to a central scheduler. The scheduler reconfigures the switch fabric to a new port mapping once per epoch, where an epoch is long enough to allow each ingress port to transmit a large plurality of queued packets. The scheduler also sends port mapping information to the ingress ports, so that those ports can match one of their queues with the egress port mapping for each epoch. The switch fabric can achieve extremely high throughput since it doesn't recognize and switch packets per se, but deals with large multi-packet blocks that can be efficiently scheduled by the central scheduler.

23 Claims, 15 Drawing Sheets

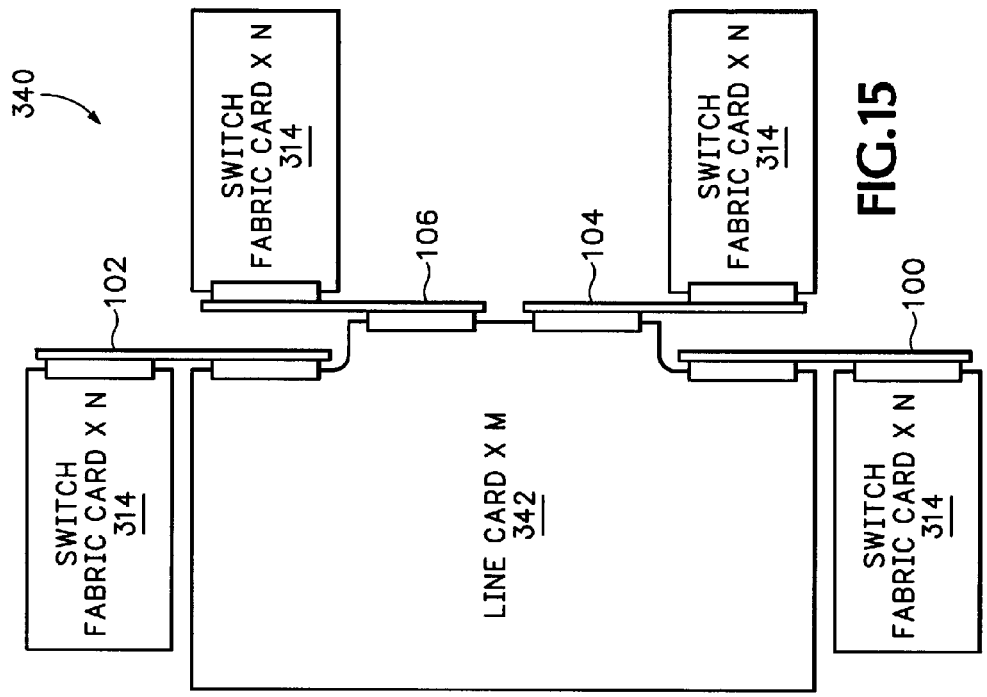
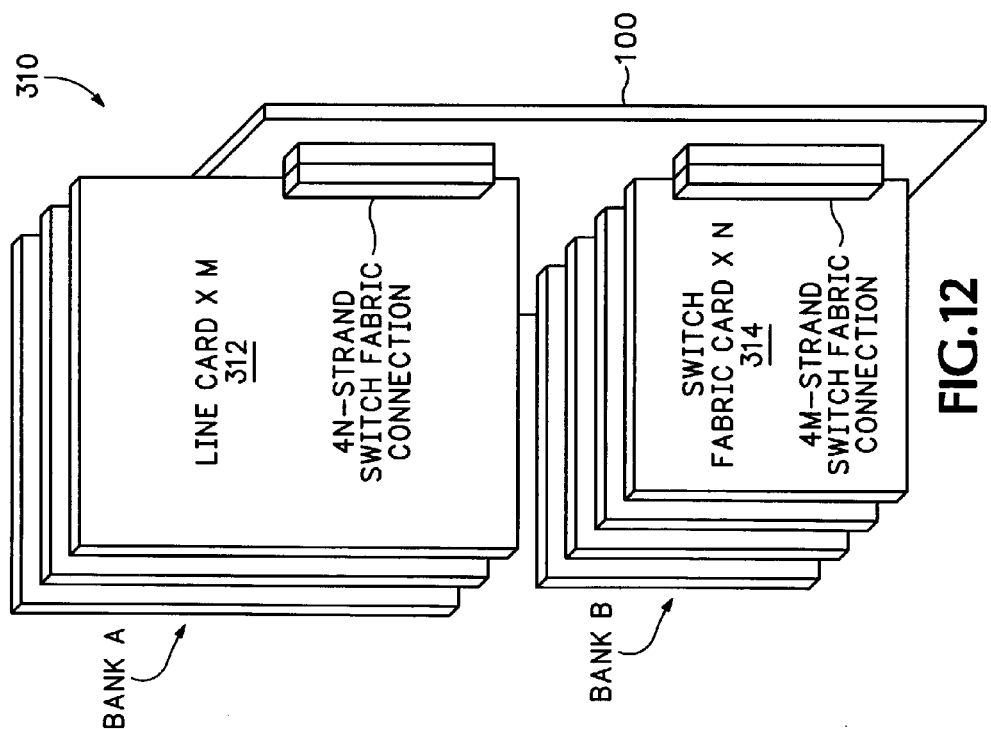

EPOCH-BASED PACKET SWITCHING

FIELD OF THE INVENTION

This invention relates generally to routers and switches, and more specifically to architectures and methods for operating the switching core of a router or switch.

BACKGROUND OF THE INVENTION

Packet-based networks transport data in finite-length blocks, often called "packets", "frames", or "datagrams" in different contexts. A typical packet comprises a header and a payload. The header contains information about the packet's source and destination, and may contain other information that may be useful to devices along the packet's route such as time-stamps, priority information, flow control information, error-detection/correction checksums, etc. The payload contains the data to be delivered, and may include higher-level headers.

The job of a packet-based network is to deliver each packet from its source to its destination, efficiently, in a timely manner, and with as few lost packets as possible. Many of these packets will be handled during transit by routers and/or switches. Unless a data packet passes directly between its source device and destination device, such as might occur on a point-to-point connection, a modem-based circuit-switched connection, or a multiple-access collision-detection local area network (LAN), that packet will pass through at least one switch or router, and in some cases the packet will pass through many such devices.

Switches generally operate at layer two (the link layer) of a networking model. Routers generally operate at layer three (the network layer) of a networking model. For example, an Ethernet switch might read a layer two MAC (Media Access Control) header address on each incoming packet at one port, look up the MAC address in its forwarding table, and forward the packet out an appropriate port or ports towards that MAC address. An IP (Internet Protocol) router performs a similar function with IP destination addresses—the main functional difference being that the packets routed by the router are, in an Ethernet context, addressed to the router itself at layer 2. The router strips the layer 2 header, looks up the next-hop router for the layer 3 header, and prepends a new layer 2 header addressed to that next-hop router.

Behind the scenes, there can be other differences in routers and switches, e.g., how each populates its forwarding tables. For purposes of the present disclosure, however, these differences are not important. Thus the remainder of this disclosure will use the term "router" to refer to all multi-port packet devices capable of selectively forwarding packets to their output ports, regardless of the header layer used for the forwarding decision or how forwarding decisions get made.

All routers have external ports for receiving and transmitting packet data streams. Within the router, some packets may be dropped for various reasons, and some packets may be destined for the router itself and are therefore kept. The remainder of the packets are forwarded to one (or more) of the router's output ports according to a forwarding table lookup. For ten consecutive packets received at one port, each of those packets could conceivably be forwarded out a different output port; a different ten consecutive packets may all be forwarded out the same output port. Thus the core of the router, where packets actually get shuffled between ports, must be adaptive to changing traffic demands and adept at switching packets in order to avoid creating bottlenecks or unduly delaying some traffic.

Small routers may make all packet-forwarding decisions at a central location, e.g., a "forwarding engine" that touches each packet received by the router. As traffic load increases, the sheer number of packets that must be processed will overwhelm a single forwarding engine. Thus large routers often distribute forwarding tables to and make forwarding decisions at multiple forwarding engines, each assigned to certain ingress ports, egress ports, or both. FIG. 1 shows a simplified block diagram for one such router 20, and traces the path of two packets "ABC" and "PQR" through the router. Three forwarding engines 32, 42, and 52 serve three groups of input ports 30, 40, and 50, respectively. Each forwarding engine performs packet lookup for each packet arriving at its assigned input ports, and identifies the location where the packet should be sent. In this example, the location is one of the cell switch fabric output ports O0, O1, and O2. For instance, forwarding engine 32 receives packet ABC at one of input ports 30 and determines that the proper output port for packet ABC is one of ports 59. Forwarding engine 32 places a header or "tag" T on packet ABC so that the switch fabric can identify that packet with output port O2, and then transmits tagged packet TABC to port interface 34.

Port interface 34 places the packet in the format expected by switch fabric 22. Typically, switch fabric 22 operates on small, fixed-length "cells", not variable-length packets. Thus port interface 34 divides the packet received from forwarding engine 34 into an appropriate number of cells for that packet's length, tags each cell with an identifier for output port O2, and submits the cells to switch fabric input port 10. In the example, port interface 34 divides tagged packet TABC into three sequential cells TA, TB, and TC.

Cell switch fabric 22 accepts cells from switch fabric input ports I0, I1, and I2, and switches those cells to output ports O0, O1, and O2, according to each cell's output port identifier. During switching of a packet, it is likely that cells from other input ports will contend for the same output port as cells TA, TB, and TC. For instance, port interface 54 has prepared three cells TP, TQ, and TR for transmission to output port O2. When those cells are presented to switch fabric 22 at approximately the same time as cells TA, TB, and TC, the cells from the two input ports may arrive at fabric output port O2 interleaved, as shown in FIG. 1. Port interface 56 has the job of sorting and rejoining the cells to reproduce packets TABC and TPQR.

Finally, egress switch 58 receives packets TABC and TPQR, looks at the respective tags T to determine the appropriate router output port for each, and prepares packets ABC and PQR for transmission out their respective ports 59.

SUMMARY OF THE INVENTION

A router such as the one just described has several core architectural characteristics that establish a practical ceiling for the operating speed that such an architecture can attain. First, because the forwarding engines do not coordinate with each other as to which egress port(s) each is sending packets to, port loads can become imbalanced, blocking can occur, and efficiency suffers. Second, if traffic rate (measured in bits/second) doubles, the number of cells/second roughly doubles, and the number of switching decisions that must be made by the cell-switching fabric every second doubles. The bottleneck can become not the data paths themselves, but the speed of the cell-switching scheduling logic. Simply increasing cell size to compensate may not help throughput, if it results in many cells that are partially empty. These problems stem from the fundamental assumption in such systems that the router core must handle and recognize packets and/or cells.

The preferred embodiments described herein are based on a rejection of the assumption that a packet router's core must switch packets or cells. What has been heretofore unrecognized is that a better approach exists for a high-end system, where traffic can be dealt with in the router core using more of a statistical approach instead of on a packet-by-packet basis. In this approach, individual packets/cells are not scheduled and switched through the router core per se. Instead, packets bound for a common router core egress port are queued together prior to a router core ingress port, and the queue is scheduled for switching by a central scheduler at a future epoch, or switching time slice. The queue is one of many queues maintained at that core ingress port (at each core ingress port, at least one queue is preferably maintained for each core egress port). By rearranging packet streams in this manner prior to router core switching-a rearrangement process that can be relatively easily handled at the ingress ports—the core ingress ports can remove a great deal of the switching and scheduling load from the router core.

The core ingress ports inform the central scheduler as to which of their queues have data waiting for transfer through the router core. The central scheduler tells each core ingress port which queue it should transmit during each epoch. Because the scheduler controls which traffic leaves each core ingress port, and in which order it leaves, blocking issues in the router core can be greatly reduced. The scheduler can also enforce concepts such as priority, fairness, and maximum latency in assigning an order to queues competing for the same egress port.

Other benefits flow directly from such a design. Where a prior art cell-switching fabric individually schedules and switches data in 48-bit cells, a switch fabric in a preferred embodiment of the invention schedules and switches data in 200,000-bit segments. The concomitant 4000× reduction in the number of core switching decisions for a given amount of packet data allows ample time for the sophisticated scheduling described above, even at terabit/second throughput rates.

The router core preferred for this queue-based switching system takes advantage of the central scheduling and large switching-segment size by remaining simple, oblivious to the notion of packets, and therefore fast. Multiple parallel switch fabrics form a switch fabric array. These switch fabrics do not make or implement independent switching decisions. Instead, they are ganged to the central scheduler that reconfigures them as a group on an epoch-by-epoch basis. Thus at any particular epoch each fabric in the array is switching data from the same fabric input ports to the same fabric output ports as each other fabric in the array.

The, e.g., 200,000-bit transfer package sent from a port in one epoch is partitioned among N switch fabrics. Although there are many possible ways of doing this, in a preferred embodiment the transfer package is read out of its queue in N×m-bit words. Each word is split into N m-bit subunits, and one of the m-bit subunits is transmitted to each of the N switch fabrics. At the output port, the N m-bit subunits are recombined to form the original N×m-bit word.

BRIEF DESCRIPTION OF THE DRAWING

The invention may be best understood by reading the disclosure with reference to the drawing, wherein:

FIGS. 12–15 show different backplane/card configurations for connecting different numbers of switch fabric cards in a router.

DETAILED DESCRIPTION OF THE PREFERRED EMBODIMENTS

Figure 1:
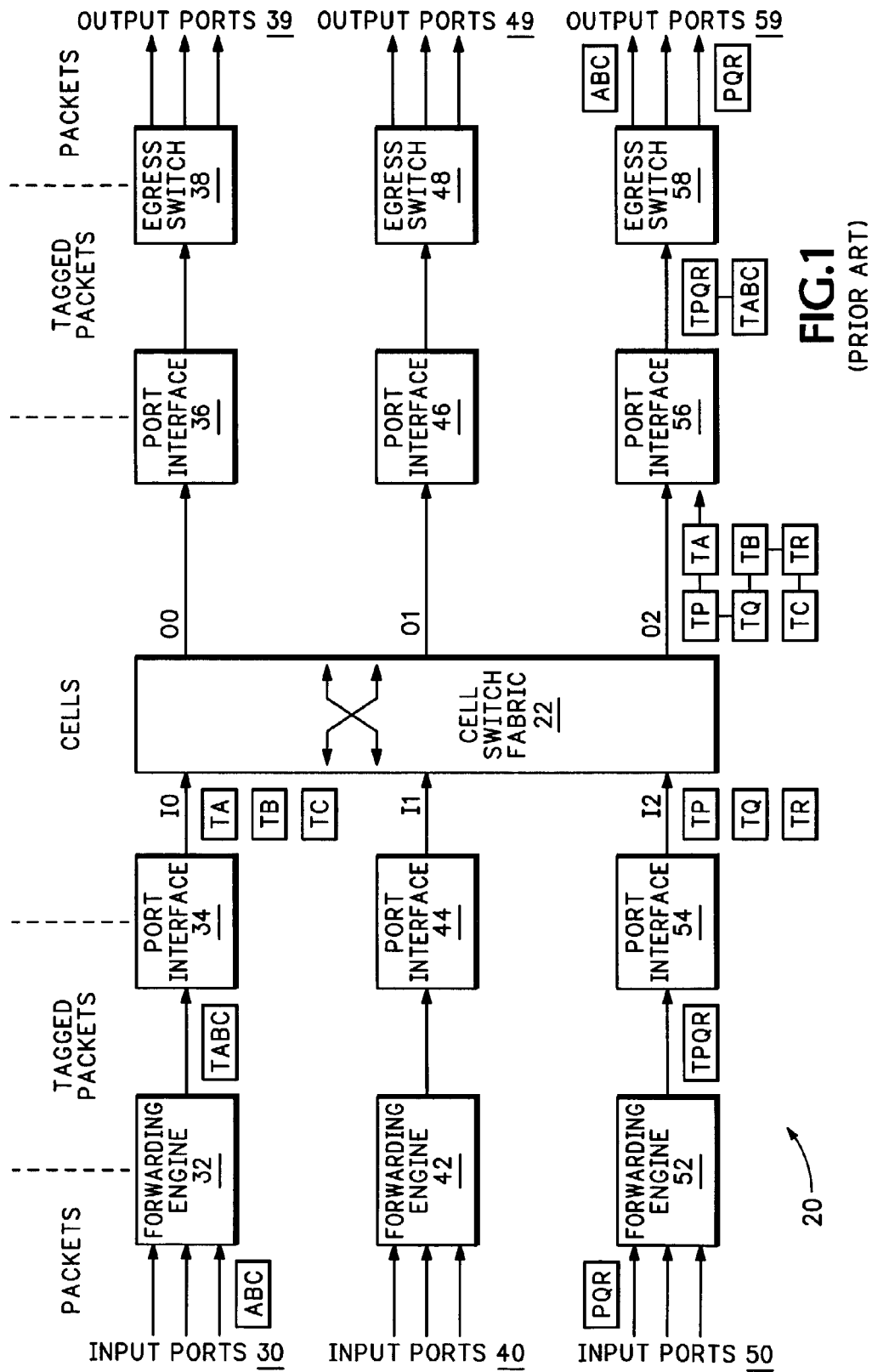
FIG. 1 illustrates a simplified prior art router configuration in block diagram form.
Figure 2:
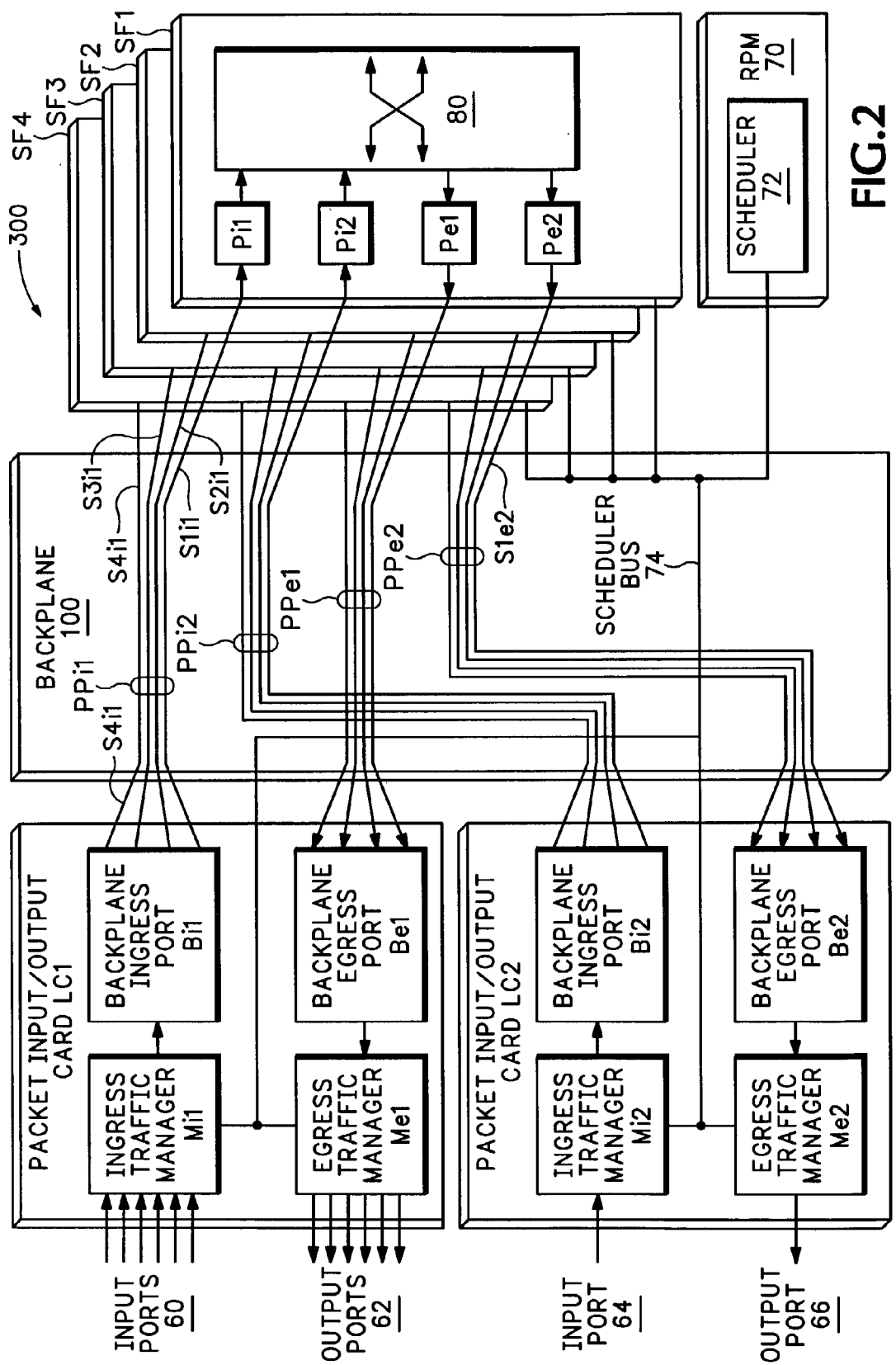
FIG. 2 illustrates a simplified diagram for a router configuration according to an embodiment of the invention.

As an introduction to the embodiments, FIG. 2 shows a basic diagram for a router according to an embodiment of the invention. The router comprises two packet-input/output cards, LC1 and LC2, four switch-fabric cards, SF1, SF2, SF3, and SF4, and a route-processing module RPM 70, all connected to a backplane 100.

The packet-input/output cards, also known as "line cards", provide physical data interfaces for communicating data from or to the world outside of the router. Card LC1 shows six input ports 60 and six output ports 62, e.g., optical Gigabit Ethernet ports. Card LC2 shows one input port 64 and one output port 66, e.g., optical 10-Gigabit Ethernet ports or OC-192 POS (Packet-Over-Sonet) ports. Of course, the invention is not limited to any particular number, type, or distribution of ports, but FIG. 2 is exemplary. Likewise, at least one line card and two output ports are necessary to provide meaningful data-routing, but the invention is not limited to any maximum number of line cards.

Not shown in LC1 and LC2 is the particular circuitry for interfacing with ports 60, 62, 64, and 66, processing packet headers, performing routing table lookups, etc. The implementation of this circuitry is peripheral to the claimed invention, within the skill of those in the art, and will be described briefly in one implementation along with FIG. 5. For purposes of the central discussion, however, it is sufficient that a mechanism exists for reporting received packets to ingress traffic managers Mi1 and Mi2, with some identification of the output port(s) those packets are bound towards. And for egress traffic managers Me1 and Me2, it is sufficient that some mechanism exists for taking packets from those managers and placing them on the appropriate output ports.

In a preferred embodiment, the ingress traffic managers queue incoming packets in multiple queues, each queue corresponding to a backplane egress port. In variations on this basic design, a) multiple queues can correspond to the same backplane egress port, the multiple queues differentiated to handle packets of different classes, priorities, etc., and b) some queues can be designated as multicast queues, corresponding to a defined group of backplane egress ports. A remote scheduler (to be described shortly) identifies at each epoch which of the input traffic manager's queues should be used to supply data to backplane ingress port Bi1.

Backplane ingress port Bi1 maintains a port pipe connection PPi1 to switch fabric cards SF1–SF4 as a group. Each port pipe comprises, in this example, four strands, one for each switch fabric card. Taking PPi1 as an example, a first strand S1$i$1 connects to switch fabric card SF1, a second strand S2$i$1 connects to switch fabric card SF2, a third strand S3$i$1 connects to switch fabric card SF3, and a fourth strand S4$i$1 connects to switch fabric card SF4. Data supplied to backplane ingress port Bi1 is split among these four strands and transmitted in parallel to the switch fabric cards over port pipe PPi1.

Each switch fabric card processes the strand it receives. As this example has four port pipes (two ingress and two egress), each switch fabric card has four single-strand card ports, one per port pipe. For instance, SF1 receives strand S1$i$1 of port pipe PPi1 at switch-fabric-card-ingress port Pi1, and SF1 transmits strand S1$e$2 from switch-fabric-card-egress port Pe2.

Switch-fabric-card-ingress port Pi1 supplies data from strand S1$i$1 to a switch-fabric-input port on switch fabric 80—the port that corresponds to line card LC1's position in the router. Just as scheduler 72 provides queue-scheduling instructions to ingress traffic manager Mi1 for a particular epoch, it must also configure switch fabric 80 to switch data now being received from that queue to the appropriate line card and backplane egress port. In this simple two backplane-port example, this means that at each epoch, switch fabric 80 will be configured to switch data from port Pi1 to one or both of switch-fabric-card output ports Pe1 and Pe2 (unless Mi1 is idled for that epoch). The other switch fabric cards will be configured identically to process the other strands of PPi1.

Consider an epoch when ingress traffic manager Mi1 on line card LC1 has been instructed to transmit packets that it has queued for backplane egress port Be2, and the switch fabric cards have been instructed to switch data received at port Pi1 to port Pe2. Data from that queue is stranded, transmitted over port pipe PPi1 to the switch-fabric cards, switched through the fabrics, and transmitted over port pipe PPe2 to backplane egress port Be2 on line card LC2. The strands received at port Be2 are merged and egress traffic manager Me2 has received the contents of the queue from ingress traffic manager Mi1. Of course, during this same epoch ingress traffic manager Mi2 can be transmitting the contents of one of its queues to egress traffic manager Me1 over port pipes PPi2 and PPe1.

Scheduler 72 is shown as residing on route processing module (RPM) card 70. RPM card 70 provides overall administrative control to the router. RPM 70 is responsible for overall system operation, i.e., recognizing and booting new line cards, identifying faulty line cards, discovering packet routes, and sharing routing table information with the line cards. RPM 70 also provides a user interface (not shown) to allow a system operator to configure the system and view system parameters. Although these functions are all necessary, they are peripheral to the router core switching concepts claimed herein and will not be described further. For each of these functions, RPM 70 generally communicates with the line cards over a control bus (not shown). As compared to the switching fabric ports, the control bus can be a relatively low-speed channel.

With regard to the present disclosure, the primary duty of RPM card 70 is scheduling the usage of the switch fabric cards SF1, SF2, SF3, and SF4. In a preferred implementation, scheduler 72 on RPM 70 communicates with each switch fabric card and each line card over a scheduler bus 74. As compared to the switch fabric port pipe connections, the scheduler bus can be a relatively low-speed channel. Ingress traffic managers use the scheduling bus to notify scheduler 72 as to which of their queues have data to send. Scheduler 72 gathers these requests and arbitrates them, e.g., using the arbitration scheme disclosed in copending U.S. patent application Ser. No. 09/676,046, "Scheduling and Arbitration Scheme For Network Processing Device", filed Sep. 28, 2000, and incorporated herein by reference. Generally, scheduler 72 attempts to schedule fuller queues first, higher-priority traffic first, and oldest requests first. When multiple contending requests cannot be prioritized on these factors alone, those requests are scheduled fairly using a round-robin approach. Once it has arrived at a schedule for an upcoming epoch, scheduler 72 uses scheduling bus 74 to communicate the results of the arbitration to the ingress traffic managers, switch fabric 80, and the switch fabric counterparts on the other switch fabric cards.

Backplane 100 contains slots for line cards, switch fabric cards, and RPM cards. Within the backplane itself, signals are routed between the slots to form the ports and buses illustrated in FIG. 2. Although optical backplanes or hybrid systems that route some signals optically and others electrically are possible, preferred embodiments use an electrical backplane.

Figure 3:
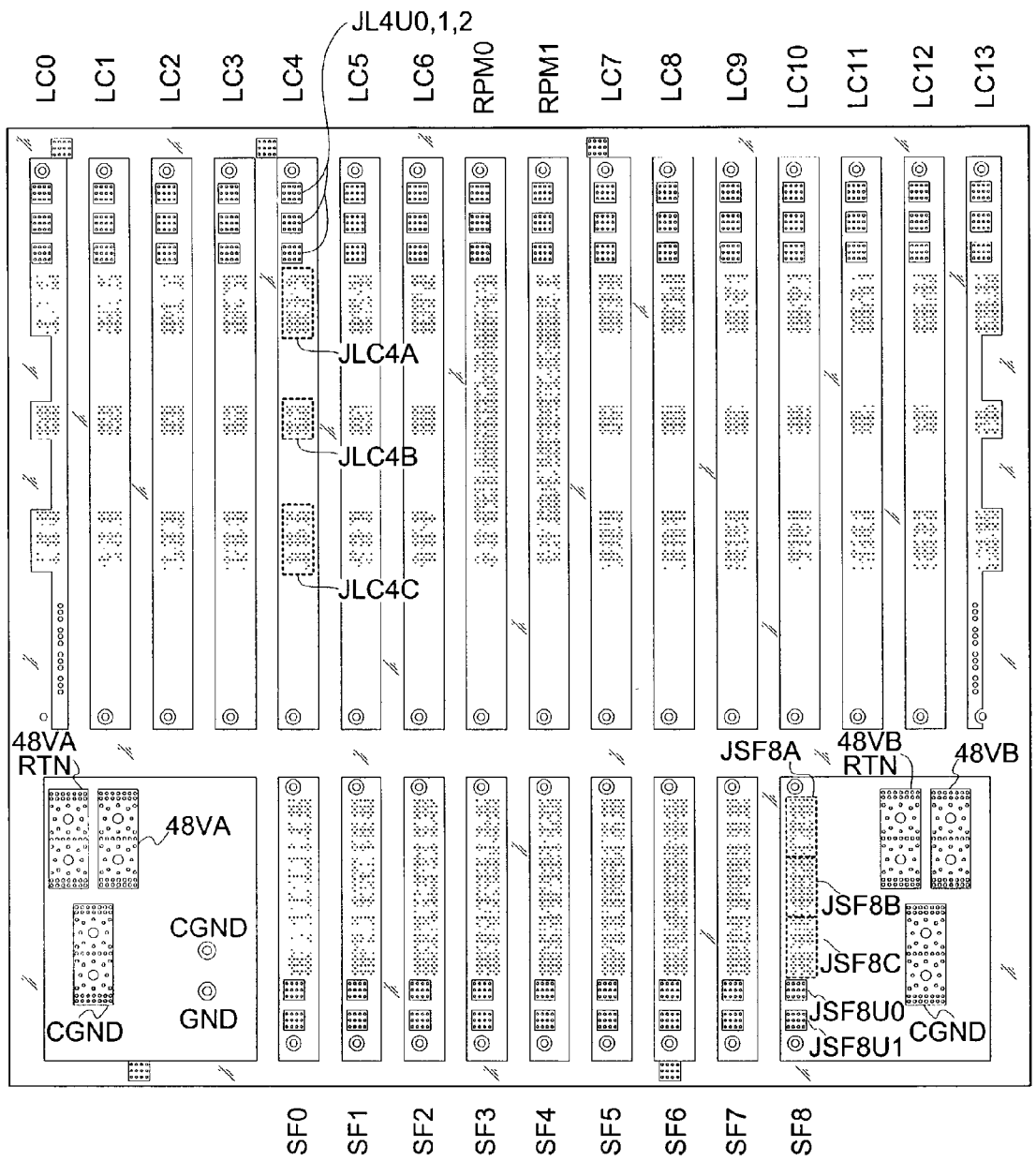
FIG. 3 shows the plan view of a backplane layout for a backplane useful in an embodiment of the invention.

FIG. 3 shows a detailed backplane-plating layout for an electrical backplane 100 useful with the present invention. A top panel region of backplane 100 has connector regions ("slots") for sixteen cards. The outboard seven slots on each end are each configured to accept a line card (slots LC0 to LC6 and LC7 to LC13). The middlemost two slots are each configured to accept a route-processing module (slots RPM0 and RPM1). Each slot has three upper connector regions (e.g., regions JL4U0, JL4U1, and JL4U2 for slot LC4) used to distribute power and ground signals to a card. Below these, each line card slot has three high-speed connector regions (e.g., regions JLC4A, JLC4B, and JLC4C for slot LC4). The RPM slots serve more card connections than the line card slots, and therefore use a larger high-speed connector region. In one embodiment, the high-speed connector regions are laid out to accept HS3 press-fit sockets, available from AMP Incorporated.

A bottom panel region of backplane 100 contains connector regions or slots for nine cards. Each of these slots is configured to accept a switch fabric card (slots SF0 to SF8). Each slot has two lower connector regions (e.g., regions JSF8U0 and JSF8U1 for slot LC8) used to distribute power and ground signals to a switch fabric card. Above these, each switch fabric card slot has three high-speed connector regions (e.g., regions JSF8A, JSF8B, and JSF8C for slot SF8).

The bottom panel region also contains connector regions for connecting power and ground to the backplane. Two 48-volt power distribution layers are embedded in backplane 100, an "A" power distribution layer and a "B" power distribution layer. At the lower left of backplane 100, two large multi-throughhole regions 48VA and 48VA RTN allow for connection of "A" power supply and return leads to one power supply, and a third large region CGND allows for connection of a common ground. Similar connections for a "B" power distribution layer to a second power supply exist at the lower right of backplane 100.

Figure 4:
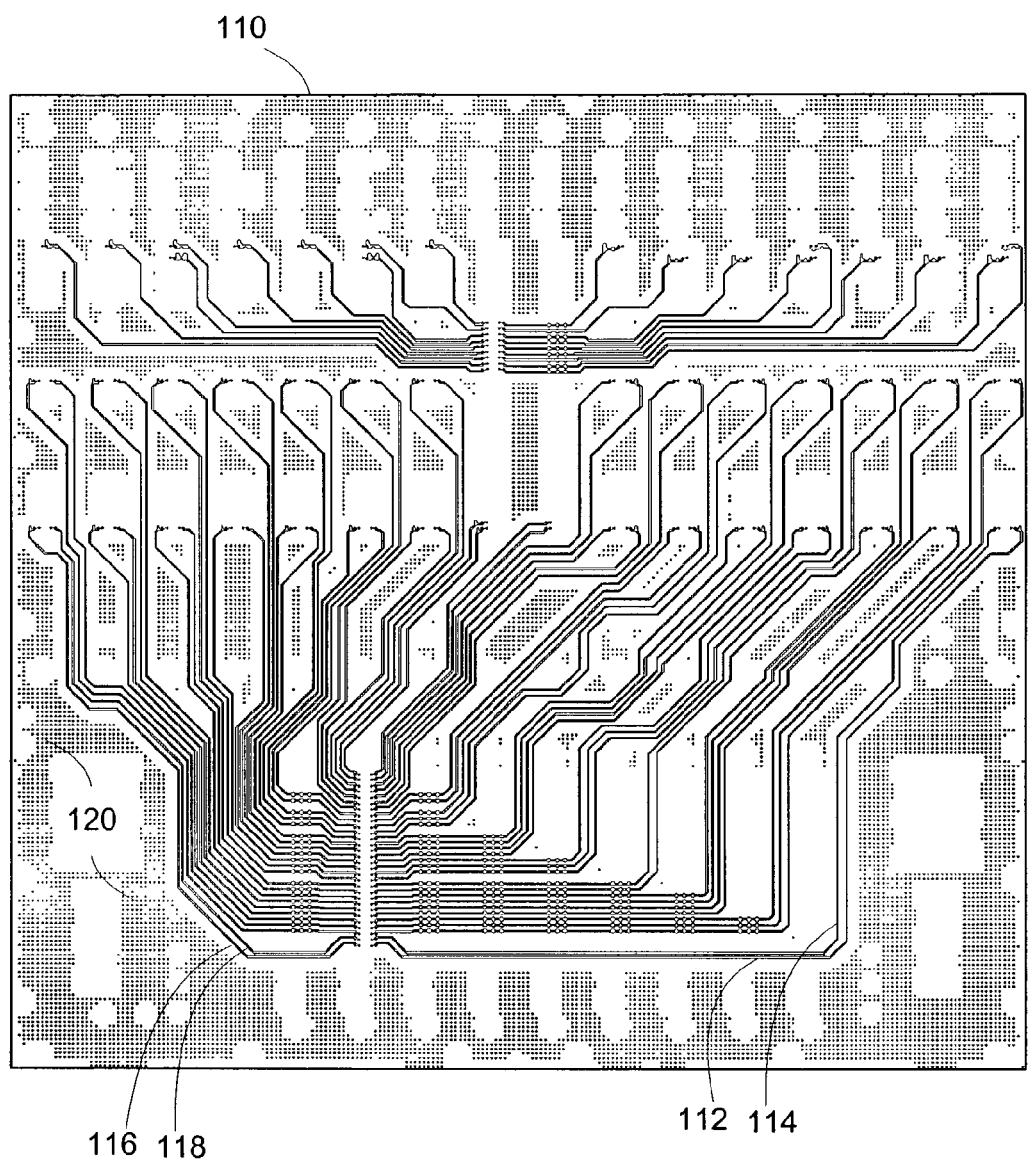
FIG. 4 shows one routing layer of the backplane of FIG. 3, showing differential pair routing for all line card port strands connected to switch fabric card SF1 ports.

FIG. 4 shows an etch mask 110 for one trace routing layer from backplane 100. The trace routes on the bottom three-quarters of mask 110 each represent one differential signaling pair connecting a line card connector pin pair to a pin pair at switch fabric card connector SF1. For instance, differential pairs 112 and 114 support, respectively, an ingress strand and an egress strand for port pipes on one-half of line card LC13 (each line card in this embodiment supports two ingress and two egress port pipes). Differential pairs 116 and 118 support an ingress strand and an egress strand for port pipes for one-half of line card LC0. It can be seen from FIG. 4 that a total of 60 differential pairs route to switch fabric card connector SF1, supporting 60 port pipe strands (two ingress and two egress strands for each of 14 line card slots, and one ingress strand and one egress strand for each of two RPM slots).

Other layers of backplane 100 provide similar differential pair routing from the line card slots to other switch fabric card slots. In this configuration, a switch fabric port pipe actually comprises nine differential pairs connected to a line card slot-one pair per switch fabric card. It is noted that the particulars of backplane layout will depend on the implementation, but copending U.S. patent application Ser. No. 10/068,616, titled "High-Speed Router Backplane", filed Feb. 5, 2002, and incorporated herein by reference, further describes construction of the backplane embodiment illustrated in FIGS. 3 and 4. Note also that the dotted regions of mask 110, such as region 120, are not traces. The dot pattern is known as "thieving", and is inserted in blank regions of the trace layer to improve manufacturability.

Figure 5:
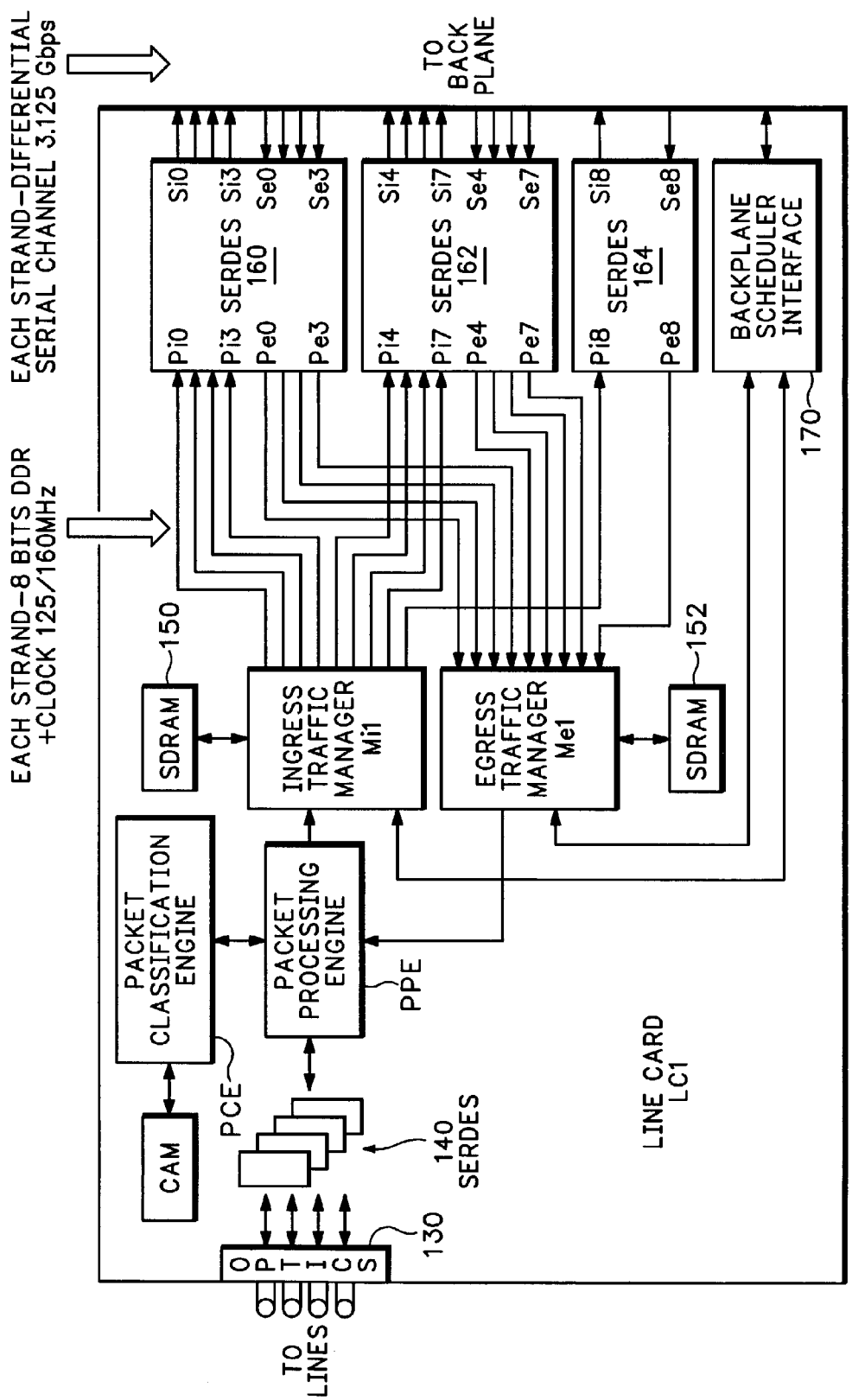
FIG. 5 contains a more detailed block diagram for a line card useful in an embodiment of the invention.

FIG. 5 illustrates, in further detail, one half of a line card LC1 useful with the backplane of FIGS. 3 and 4 (it has been noted that each line card duplicates the functionality shown in FIG. 5 for a second set of ports). Optics 130 provides ports for connection to data lines routed by the router. Depending on the number of optical ports, the optics communicates with one or more serializer/deserializer (serdes) units 140 that modulate/demodulate the physical waveforms used to transmit bit streams.

Serdes 140 transmits a typical ingress packet to packet processing engine PPE. Engine PPE sends the packet's header information to a packet classification engine PCE, where the proper router egress port for the packet is determined with reference to routing tables stored in ternary content-addressable memory CAM. Engine PPE sends the packet, along with the egress port information from engine PCE, to ingress traffic manager Mi1.

The ingress traffic manager manages a set of queues for that line card's backplane ingress port (i.e., strands Si0–8 in FIG. 5). At least one queue exists for each backplane egress port. Preferably, a group of queues exists for each backplane egress port, each queue in the group representing a different priority. The ingress traffic manager sorts each packet bound for that egress port in a queue corresponding to their priority and backplane egress port. Additionally, some queues can be designated as "multicast" queues, each of which contains packets addressed to a specific plural subset of the backplane egress ports.

In FIG. 5, SDRAM bank 150 serves as a common packet repository used by all queues. The ingress traffic manager maintains a set of pointers into that memory space to identify the packet at the head of each queue. Linked lists are used to connect the packets in each queue, forming a Virtual Output Queue (VOQ) for each queue in the shared memory. Each time the ingress traffic manager receives a packet from the packet-processing engine, it stores it in SDRAM 150 (unless the packet is discarded) and adds it to the end of the linked list for that packet's corresponding VOQ.

Ingress traffic manager Mi1 includes queue status circuitry to track which packet queues currently have packets awaiting transfer across the backplane. In one embodiment, the queue status circuitry comprises a table memory that is updated as packets enter and leave each queue.

At least once per epoch, each ingress traffic manager sends a scheduling request to backplane scheduler interface 170 (for forwarding to the scheduler). The scheduling request contains status information for that traffic manager's queues—in one embodiment, the status information comprises a set of on-bit flags, one per queue. If a queue has at least one packet pending, that queue's bit is set in the status information. Alternately, more detailed information, such as the number of bytes pending in a queue, a priority value, etc., can be sent to the scheduler.

When an ingress traffic manager's backplane ingress port is to be connected through the switch fabric to a particular backplane egress port during an upcoming epoch, ingress traffic manager Mi1 receives notification from the central scheduler through backplane scheduler interface 170, as part of a scheduled port mapping. Preferably, the notification comes at least one epoch prior to the epoch scheduled for that mapping.

When more than one queue has the same backplane egress port assignment as that of a port mapping, the ingress traffic manager selects one of those queues for transmission, e.g., according to an interleaved weighted fair queuing mechanism. During the epoch immediately preceding an epoch with a given port mapping, pre-fetch circuitry within the ingress traffic manager fills a fast buffer (e.g., a FIFO) with one epoch's worth of data packets from the selected queue. If not that many packets currently reside in the selected queue, the pre-fetch circuitry can select packets from a second queue with the same backplane egress port assignment in order to fill the buffer.

An epoch begins when the traffic managers receive a Start-Of-Epoch (SOE) signal from the central scheduler. Preferably, the backplane contains one point-to-point (SOE) signal line for each line card and switch fabric card. The scheduler on the RSC enables the SOE signal on all SOE signal lines simultaneously. On the backplane, the SOE signal lines are length-matched such that all have approximately equal delay. This allows all cards to start a new epoch at virtually the same instant.

When the epoch starts, data from the fast buffer is sent to parallel ports Pi0 to Pi8 on serdes units 160, 162, and 164. Each serdes converts input parallel channels to differential serial channels and transmits them out the appropriate backplane ports, as will be described in more detail shortly.

During the same epoch, it is likely that serdes units 160, 162, and 164 will also be receiving serial data on the egress port pipe strands connected to serial ports Se0 to Se8. Each serdes converts egress serial channels to parallel channels and sends these to egress traffic manager Me1. Egress traffic manager Me1 combines the serdes strands and stores received data packets in SDRAM 152, and outputs these packets to packet processing engine PPE as instructed. Engine PPE sends packets out the appropriate serdes and optics ports.

Figure 6:
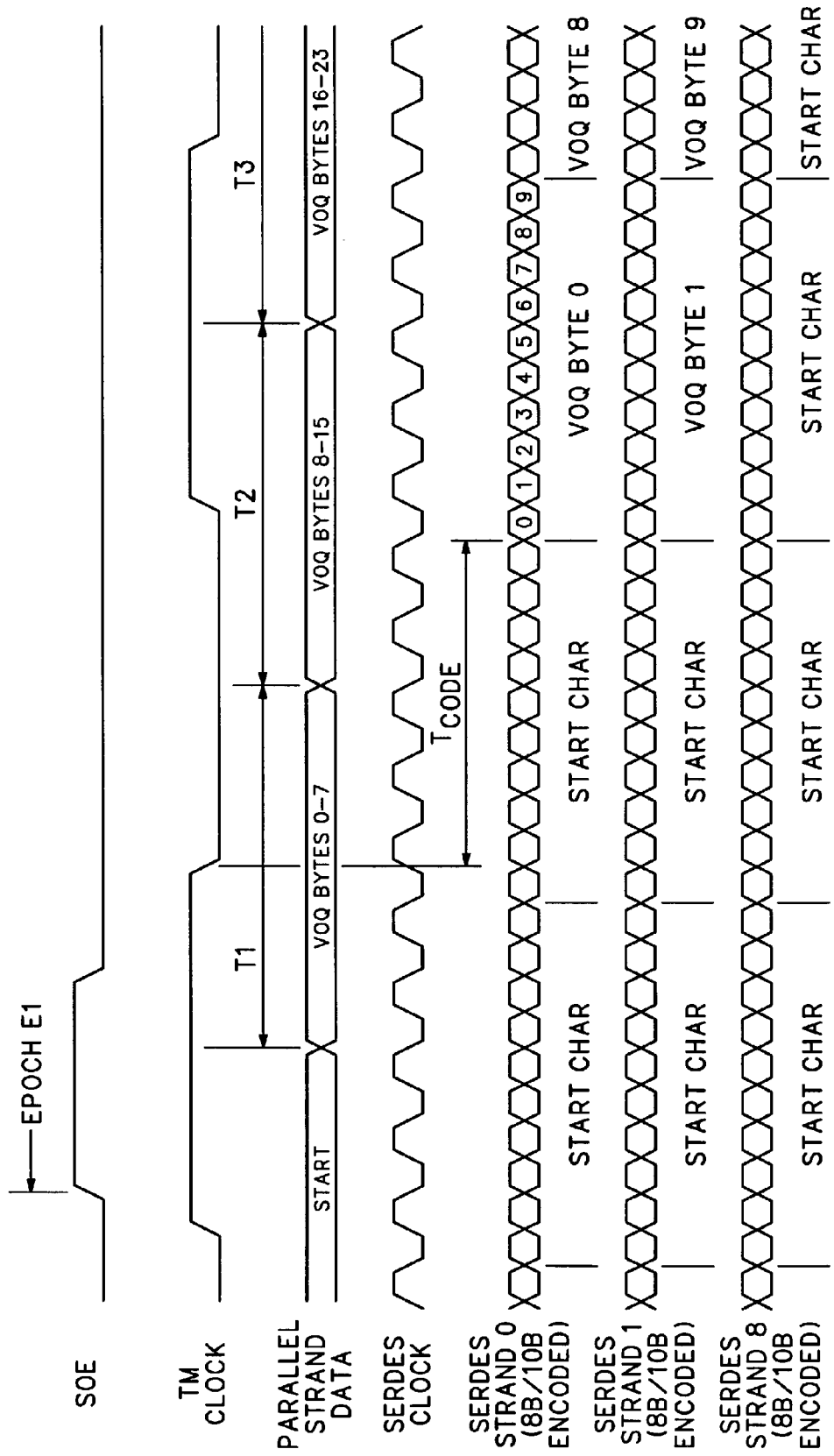
FIG. 6 shows an exemplary timing diagram for creating the backplane data signaling on the line card of FIG. 5.

The preferred manner in which queued packets are transmitted by a line card onto a port pipe is further illustrated with reference to FIGS. 6 and 7. FIG. 6 shows a representative timing diagram for the start of an epoch.

During each epoch, the ingress traffic manager supplies START characters to each serdes once its epoch timer runs out. Thus at the moment of assertion of SOE for a new epoch, START characters are being supplied to each serdes. It is highly preferable that some character stream be supplied to each serdes strand all the tim—even if that strand is not currently transmitting valid data-so that each receiving serdes maintains synchronization and timing lock with its transmitting peer and is ready to receive characters at the start of any epoch.

Accordingly, in FIG. 6 when SOE is asserted, eight bytes are sent respectively to serdes ports Pi0 to Pi7 from the current virtual output queue at the next transmit clock TM transition, and at every following TM clock transition until an epoch's worth of data has been sent. VOQ bytes 0–7 are valid during time interval T1, and are clocked in at serdes ports Pi0 to Pi7 near the midpoint of this interval. VOQ bytes 8–15 are valid during time interval T2, and are clocked in at serdes ports Pi0 to Pi7 near the midpoint of this interval. This sequence continues at time interval T3 for VOQ bytes 16–23, etc., until the data to be sent during the epoch is emptied from the queue.

Preferably, each serdes encodes each byte received at a parallel serdes port using an 8-bit to 10-bit (8b/10b) coder. Coding provides end-to-end detection of serial link errors and correction of single-bit errors. An added benefit of coding is an increase in average signal transitions per symbol of the transmitted bit pattern for some symbols, which aids clock recovery at the receiving serdes. The interval $T_{code}$ represents the amount of time between when a byte is clocked into the serdes parallel input and when the first coded bit corresponding to that byte is transmitted out the serial output. The length of $T_{code}$ is implementation-dependent, and may also include buffering time; the length shown in FIG. 6 merely illustrates the concept.

Each ten-bit coded byte is transmitted serially out a serdes serial port during ten consecutive serdes clock cycles. In order to keep pace with the parallel input strands, the serdes transmit clock should have at least ten times the clock rate of the serdes parallel input clock (but need not be synchronized to the parallel input clock). For example, in one embodiment parallel data is clocked into the serdes on both edges of a TM clock (Double Data Rate or DDR) that can run at between 125 and 156.25 MHz, and the serdes serial output rate is 3.125 Gbps.

FIG. 6 also illustrates the order in which the bytes extracted from the VOQ are coded and transmitted to the switch fabric. The coded bits from VOQ byte 0 are transmitted on serdes strand Si0 while the coded bits from VOQ byte 1 are transmitted concurrently on serdes strand Si1, and so on up to VOQ byte 7 and serdes strand Si7. After the ten coded bits for each strand are transmitted, Si0 begins transmitting the coded bits for VOQ byte 8, Si1 begins transmitting the coded bits for VOQ byte 9, etc.

In one preferred embodiment, an additional strand exists that does not actively participate in transmitting data from the VOQ. In FIG. 6, this strand is strand 8, and corresponds to serdes strand Si8 on FIG. 5. While the other strands are transmitting queue data, strand 8 continues to transmit start characters, keeping its serial link to the switch fabric up but not communicating any otherwise useful data.

Figure 7:
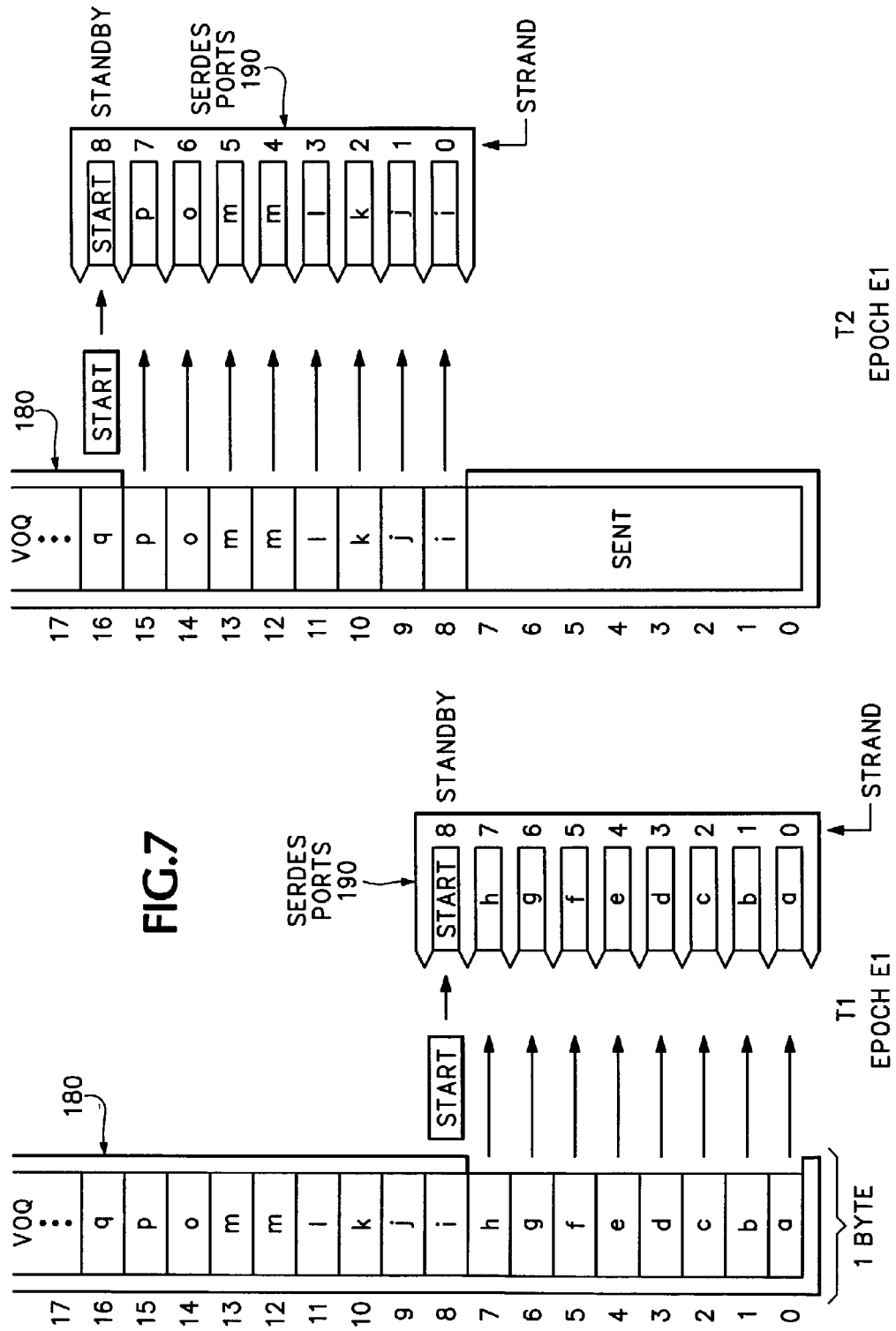
FIG. 7 illustrates how bytes (from packets waiting in a virtual output queue VOQ on a line card) are partitioned for transmission to a bank of switch fabric cards.

FIG. 7 illustrates these concepts with a representation of a VOQ 180 and a set of serdes parallel input ports 190. VOQ 180 is illustrated as one byte wide, and deep enough to hold at least an epoch's worth of bytes (the first seventeen symbols are shown). Serdes ports 190 are each one byte wide, and a total of nine ports exists, one per strand. During an epoch E1, and a first transfer interval T1, bytes a–h are transferred respectively from VOQ locations 0–7 to strands 0–7 of serdes ports 190. A start byte is transferred to strand 8 of serdes ports 190, since that strand is currently designated as a standby strand.

During a second transfer interval T2, the VOQ shifts past the previously sent bytes a–h. Thus during T2 bytes i–p are transferred respectively from VOQ locations 8–15 to strands 0–7 of serdes ports 190. Another start byte is transferred to strand 8. Thus although serdes ports 190 can accept up to nine bytes from VOQ 180 during each transfer interval, one serdes port and strand is consistently held in reserve.

Figure 8:
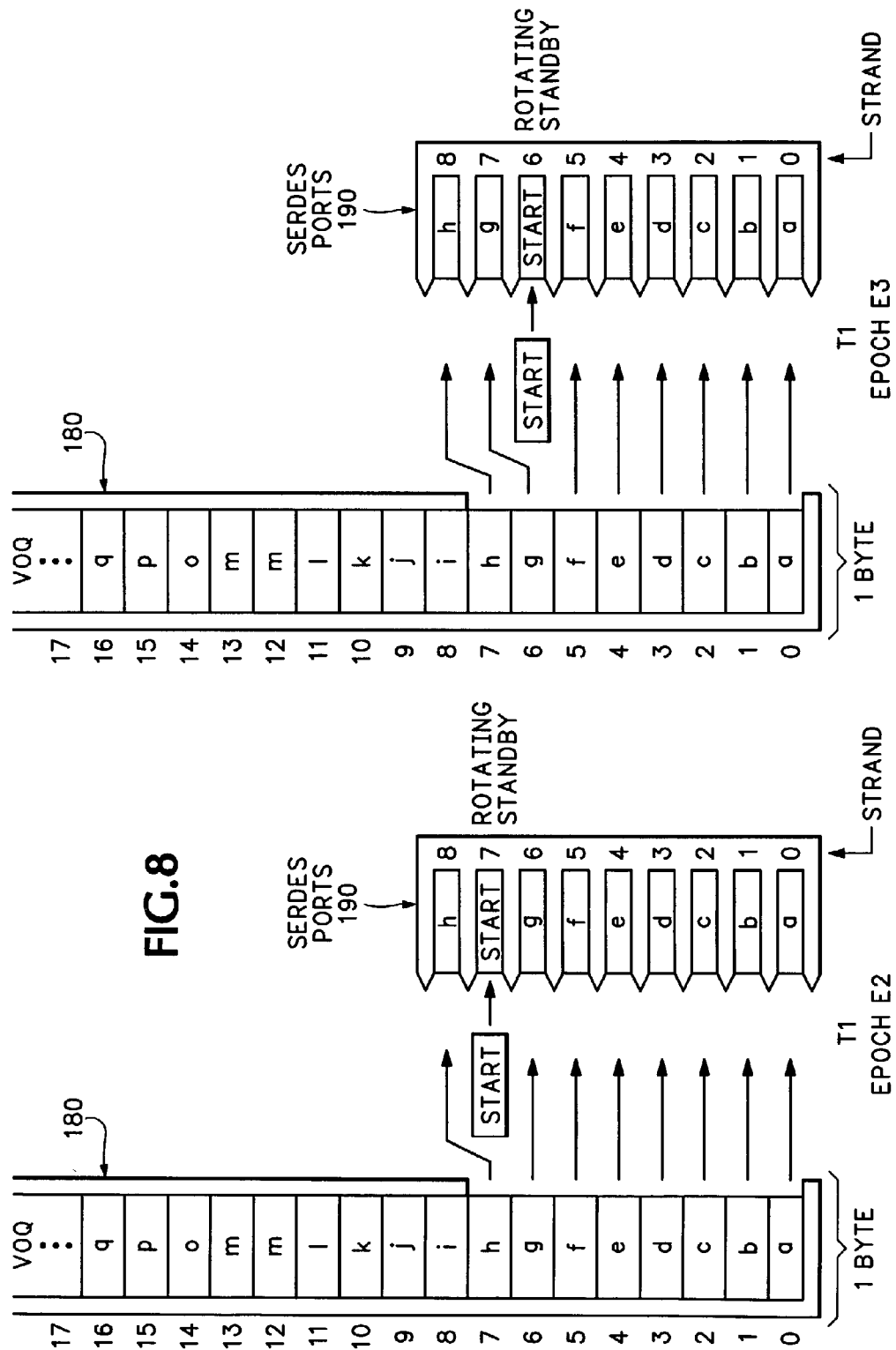
FIG. 8 contains a similar partitioning illustration, but with the switch fabric card that is in "standby" rotated each epoch.

Now moving to FIG. 8, a procedure for rotating the standby or reserve port is illustrated. Theoretically, the standby port could be rotated each transfer interval. More preferably, the scheduler notifies each ingress and egress traffic manager, as part of the next epoch's schedule, as to which strands will be active during that epoch. Thus at epoch E2, serdes port strand 7 becomes the standby strand. During transfer interval T1 of epoch E2, bytes a–h are transferred respectively from VOQ locations 0–7 of VOQ 180 to strands 0–6 and 8 of serdes ports 190, skipping strand 7 which is now on standby. At epoch E3, the standby port is rotated again, this time to serdes port strand 6. During transfer interval T1 of epoch E3, bytes a–h are transferred respectively from VOQ locations 0–7 of VOQ 180 to strands 0–5 and 7–8 of serdes ports 190, skipping strand 6. This rotating procedure can continue for all epochs, or it can be performed periodically in order to test the health of the standby and byte-shifting system. There is no need for the rotation to occur on each epoch, or that it follow a certain order.

Figure 9:
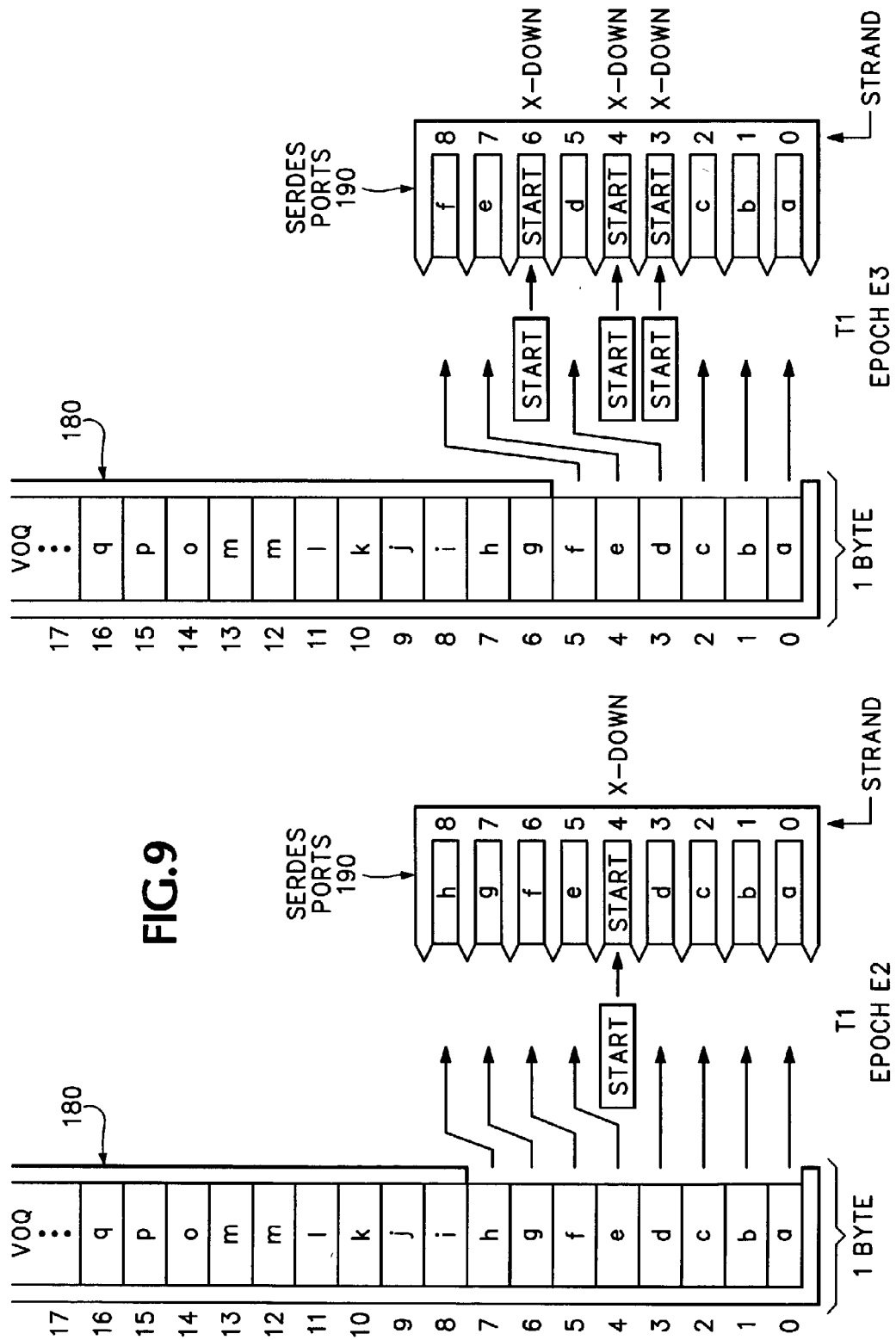
FIG. 9 illustrates byte partitioning shifts as first one and then two additional switch fabric cards go down.

An advantage of the disclosed architecture is that it provides switch fabric redundancy and rapid failover should something happen to one strand of the router core. FIG. 9 illustrates this principle. In FIG. 7, strand 8 was placed on standby during epoch E1. In this hypothetical, something happens to strand 4 on some device-something that is sensed during epoch E1. It could be complete failure of a switch fabric card SF4, a report of errors on one strand passing through SF4, a problem with one of the line card serdes devices communicating with SF4, a signal that SF4 is going down or is being removed from the chassis, etc. Whatever the cause, the scheduler compensates by activating the standby strand 8 and redirecting traffic at epoch E2. During transfer interval T1 of epoch E2 (FIG. 9), bytes a–h are transferred respectively from VOQ locations 0–7 of VOQ 180 to strands 0–3 and 5–8 of serdes ports 190, skipping strand 4 which is now marked as down. This new queue-to-strand configuration can remain in place until the health of the strands passing through SF4 is restored, at which time strand 4 can return to standby or active status.

FIG. 9 also illustrates a further enhancement that can exist in embodiments of the invention-graceful degradation of the router core without use of a standby set of strands. On the right-hand side of FIG. 9, a new queue-to-strand configuration for epoch E3 is illustrated. At epoch E3, three of nine strands (strands 3, 4, and 6) are down. The scheduler adapts by instructing ingress and egress traffic managers to only process six bytes from VOQ 180 per transfer interval.

During transfer interval T1 of epoch E3, bytes a–f are transferred respectively from VOQ locations 0–5 of VOQ 180 to strands 0–2, 5, and 7–8 of serdes ports 190, skipping strands 3, 4, and 6. The traffic rate through the router core has decreased 25%, but the router otherwise remains operational. Line cards can compensate by reducing their input flows accordingly.

From the previous examples, several router core operational modes useful with embodiments of the invention are apparent. The standby-fabric-unit mode allows full throughput to continue even if one strand of the port pipes is damaged or disabled. A non-standby-unit mode can degrade router core performance gracefully by functioning with whatever number of strands are available. This mode is also useful with partial systems—when the router is only lightly populated with line cards or router ports, a smaller number of switch fabric cards could be used as well. A power-saving mode during low-traffic periods is also possible. When traffic lessens, switch fabric cards can be shut down one-by-one, and as traffic increases, cards can be powered up again.

Although the preferred embodiments operate with byte-sized data units, nothing precludes the selection of a different transfer unit per strand. A strand could also use more than a single serial link to the switch fabric, but a single link is preferred in order to simplify routing on the backplane and reduce card connector pin count. Also, nothing precludes the use of other mappings from a VOQ byte order to the serdes ports, such as shifting data from a down strand directly to the standby strand instead of shifting all strands in between.

Figure 10:
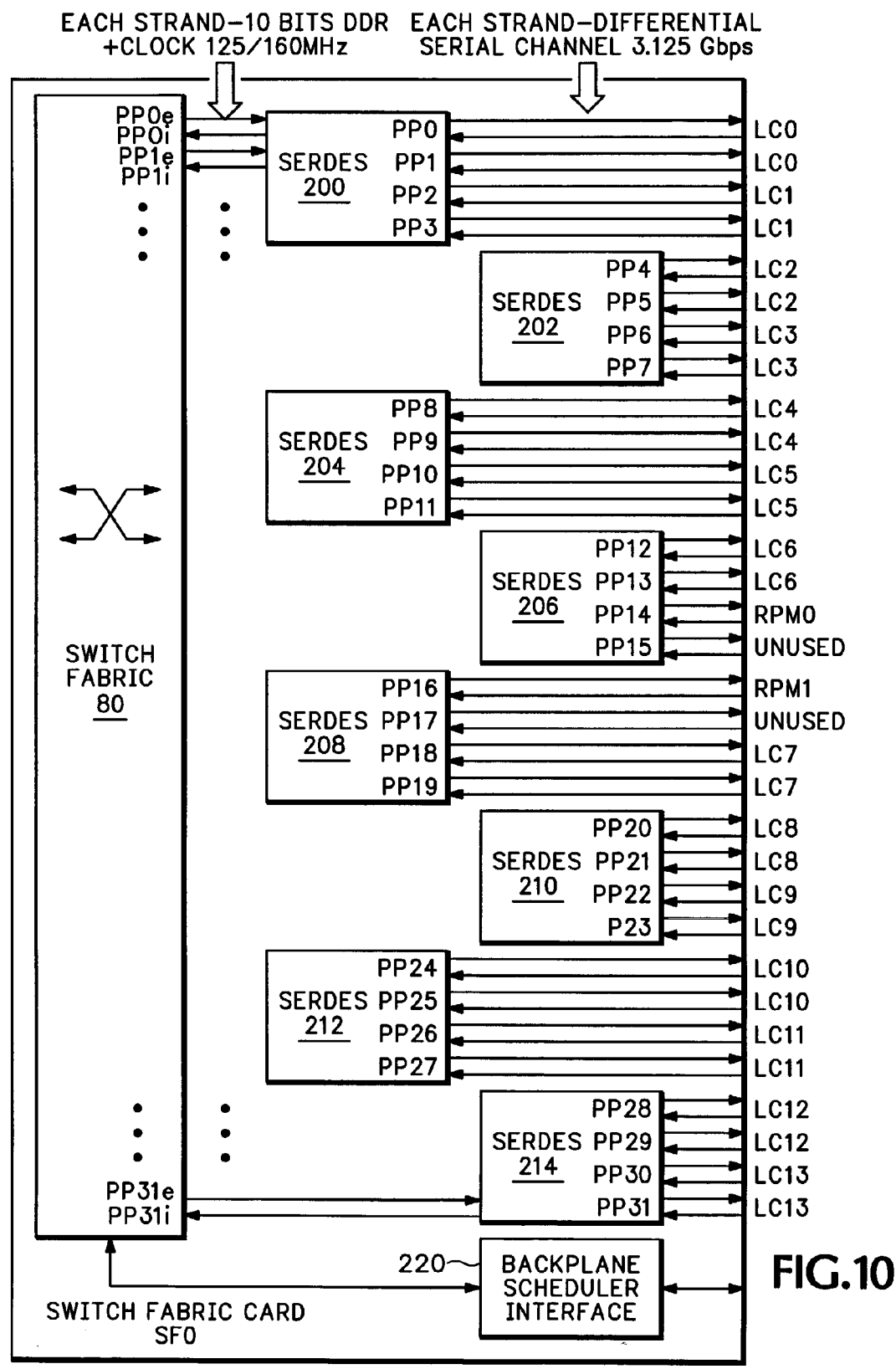
FIG. 10 contains a more detailed block diagram for a switch fabric card useful in an embodiment of the invention.

FIG. 10 shows a more detailed diagram of the switch fabric card layout as it pertains to an embodiment of the present invention that corresponds with FIGS. 3 and 4. Switch fabric 80 is a 32-input-port-by-32-output-port, 10-bits-per-port crossbar switch. Backplane scheduler interface 220 communicates with the remote scheduler to receive crossbar configuration and SOE signals for each epoch. Eight separate serdes units communicate with switch fabric 80, each serdes servicing four ingress threads and four egress threads (one set of ingress and egress threads is unused on serdes 206 and serdes 208).

FIG. 10 shows the correspondence between line card slot, port pipe designation, and switch fabric connections. Note that in this preferred configuration, switch fabric cards are identical and interchangeable for each switch fabric card slot—the card slot and backplane routing, not anything on the card itself, determine which strand from the port pipes will be served by a particular switch fabric card.

Serdes 200 serves an ingress strand and an egress strand for each of two port pipes (PP0 and PP1) from line card LC0, and for each of two port pipes (PP2 and PP3) from line card LC1. Similar service connects serdes units 202, 204, 210, 212, and 214 to port pipes from other line cards. Serdes units 206 and 208 each serve one line card and one RPM card (RPM0 maintains one port pipe, PP14, and RPM maintains one port pipe, PP16). Note that FIG. 10 illustrates the logical correspondence between the port pipe strands, serdes units, and switch fabric; the physical layout of connectors, integrated circuits, and interconnections will vary from design to design based on routing, circuit pinout, and board layout constraints.

Figure 11:
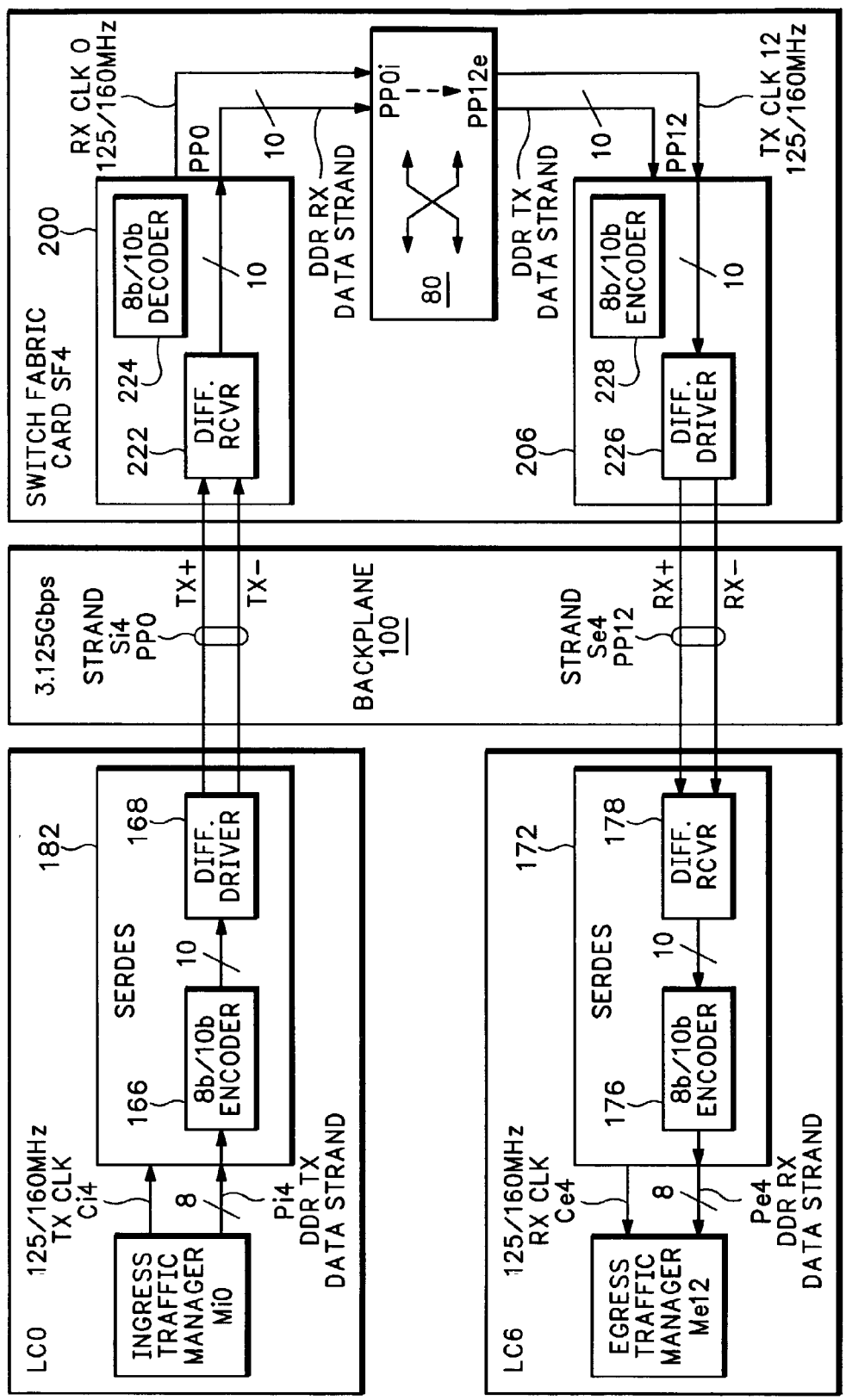
FIG. 11 shows signaling paths for switching one strand on a first line card to that same strand on a second line card, including encoding of the bit stream before introduction to the backplane.

With a description of the detailed components of a switch fabric card now in place, FIG. 11 traces one exemplary strand of data (strand 4) for one epoch, from its ingress traffic manager on line card LC0 to its egress traffic manager on line card LC6. With eight operational strands, the fifth of every eight bytes from the current VOQ is transmitted to serdes 162 using an 8-bit-wide DDR transmit data strand Pi4 and an accompanying 125/160 MHz transmit clock Ci4 (preferably, each parallel strand has a dedicated clock signal associated with it). 8b/10b encoder 166 converts each received byte to a corresponding 10-bit codeword, which encoder 166 supplies to differential driver 168. Differential driver 168 drives the ten bits of the codeword serially across backplane 100 on two differential lines TX+ and TX− that serve PP0 strand Si4.

PP0 strand Si4 is received on switch fabric card SF4 by a differential receiver 222 on serdes 200. Differential receiver 222 deserializes and sends each received 10-bit codeword over a parallel connection PP0 to switch fabric 80. Differential receiver 222 also transmits a receive clock CLK0 with the 10-bit-wide data as a DDR receive data strand.

Switch fabric 80 clocks in the 10-bit codewords using CLK0 at port PP0$i$. Switch fabric 80 switches the 10-bit codewords through its crossbar at the same clock rate, with a configuration during this epoch that transports codewords from fabric ingress port PP0$i$ to fabric egress port PP12$e$. Switch fabric 80 drives a 10-bit parallel DDR transmit data strand, along with a corresponding transmit clock CLK12, out port PP12$e$ to port PP12 on serdes 206.

Serdes 206 receives the switched 10-bit codewords from switch fabric 80 and supplies them to a differential driver 226. Differential driver 226 drives the ten bits of the codeword serially across backplane 100 on two differential lines RX+ and RX− that serve PP12 strand Se4.

On line card LC6, a differential receiver 178 on serdes 172 receives PP12 strand Se4. Differential receiver 178 sends each received 10-bit codeword to 8b/10b decoder 176, which recovers the original 8-bit symbols supplied to serdes 162 by ingress traffic manager Mi0. 8b/10b decoder 176 allows the receiving line card to check end-to-end integrity through the router core. If a single-bit error is detected in a 10-bit received codeword, that error may be simply corrected, corrected and reported, or reported as an error (more than one bit error per codeword may not be detectable, and cannot be corrected if detected using 8b/10b coding). Egress traffic manager Me12 can be configured to reject an entire epoch worth of data if uncorrectable (or correctable) errors occur on one of its strands, and those packets would be dropped. This condition can also be reported to the scheduler, which may choose to take strand 4 out of service.

Assuming that the original strand 4 data can be recovered error-free, an 8-bit-wide DDR Rx data strand Pe4, with an accompanying receive clock Ce4, transfer bytes from serdes 172 to egress traffic manager Me 12.

At the same time as the described operations are occurring, other serdes channels are transmitting the others of N=8 strands from ingress traffic manager Mi0's queue to egress traffic manager Me12's queue, using the others of N active switch fabric cards. Manager Me12 recombines the N egress strands to reconstruct the data in the sequence it existed in the ingress manager's queue.

With M1 core ingress ports and M2 core egress ports, similar operations can simultaneously connect each other ingress traffic manager's queue to its preselected egress traffic manager's queue for that epoch. Of course, not every ingress traffic manager may be authorized to transmit during every epoch.

FIG. 11 shows one other feature present on some embodiments—8b/10b encoders and decoders on the switch fabric card serdes units. Although decoder 224 and encoder 228 are shown bypassed in FIG. 11, such units can be used in several alternate operating or testing modes. First, decoder 224 can be configured to receive 10-bit codewords from differential receiver 222. It can in such a configuration detect bit errors on PP0 strand Si4, correct such errors, or simply decode the codewords and pass 8-bit data to the switch fabric. If it decodes the codewords, encoder 228 can be configured to re-encode the data prior to introduction to PP12 strand Se4. Such modes can be used to isolate which part of the router, be it a particular serdes, switch fabric circuit or card, or backplane path, is causing errors.

FIG. 12 shows, in perspective, a router 310 comprising a backplane 100 with M line cards 312 arranged in a bank A, and N switch fabric cards 314 arranged in a bank B. Each line card 312 connects to the backplane at a 4N-strand switch fabric connection (two ingress and two egress port pipes/card). Each switch fabric card 314 connects to the backplane at a 4M-strand switch fabric connection (two ingress and two egress strands for each line card). Of course, each card also maintains additional connections to serve, e.g., management and scheduling buses, power, etc. RPM cards are not shown, but may exist and add additional switch fabric connections.

It is recognized that backplane size and thickness (e.g., available routing layers) constraints generally limit the number of cards that can be interconnected on one backplane, and thus in some manner determines a practical maximum for N. The description accompanying FIG. 9 explains how router 310 can function with less than all N switch fabric cards present and operational, or more broadly, with variable N. What is not evident, though, is how throughput might be increased beyond what is available with N switch fabric cards, if the backplane can only support N switch fabric cards. In keeping with the modular nature of the preferred embodiments, FIGS. 13–15 show different configurations that allow N for a router to be increased, beyond what can be supported on a single backplane, by use of multiple backplanes.

Figure 13:
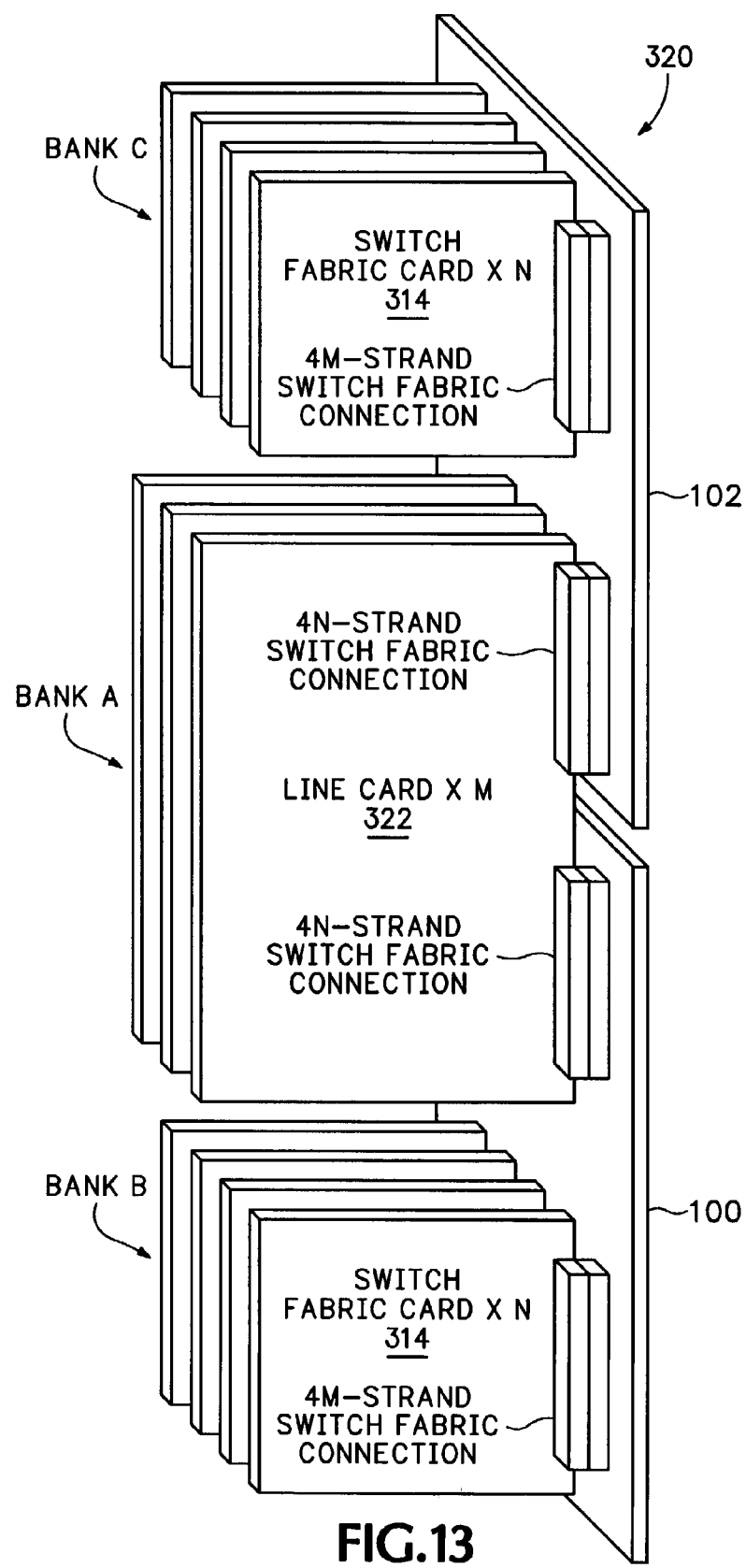

FIG. 13 shows a router 320 that supports up to 2N switch fabric cards 322 using two backplanes 100 and 102. Up to M line cards 322 still populate bank A in router 320. But up to 2N switch fabric cards 314 can now be used, N in bank B connected to backplane 100 and N in bank C connected to backplane 102. Each of the M line cards 322 now connects to both backplanes and distributes a 4N-strand switch fabric connection to each backplane, for a total of 8N strands. But each switch fabric card still switches 4M strands, and the same switch fabric cards used in router 310 can potentially be used with router 320. With forethought, backplanes 100 and 102 also can be made identical to each other, and indeed, identical to backplane 100 of FIG. 12, with backplane 102 merely a flipped backplane 100. Such modularity across platforms of different sizes reduces production costs and spares inventory, in addition to allowing easy throughput expansion.

Figure 14:
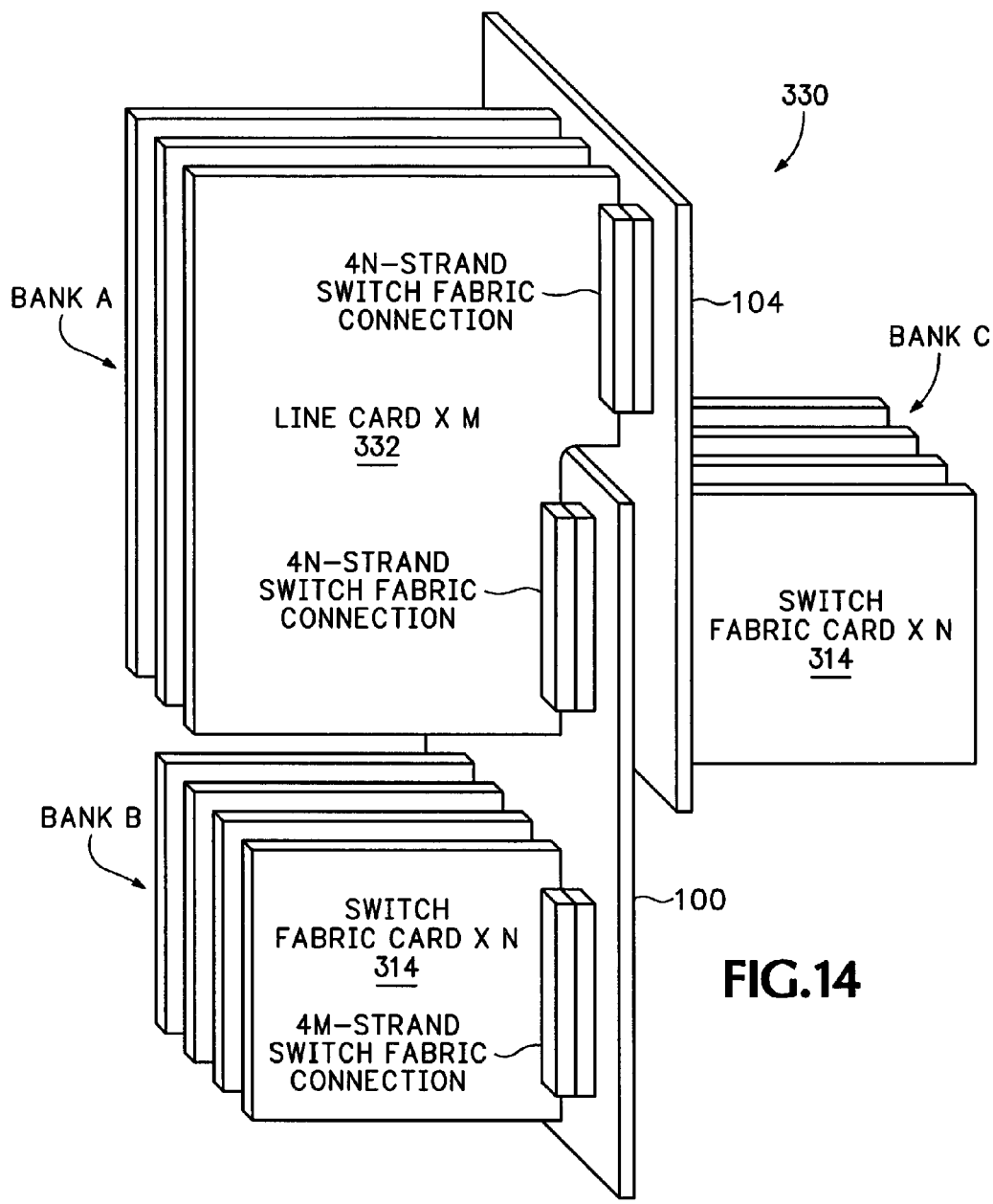

FIG. 14 shows an alternate embodiment, router 330, with two backplanes 100 and 104, and similar capabilities to router 320. Up to M line cards 332 populate bank A in router 330. Each line card distributes 4N strands to up to N switch fabric cards 314 in bank B and 4N strands to up to N switch fabric cards 314 in bank C. But line cards 332 are shaped with a stepped card edge such that the line card connector to backplane 100 is offset, depth-wise, from the line card connector to backplane 104. This allows backplane 104 to be mounted partially behind backplane 100, thus reducing the height of the router but increasing its depth. Note that backplane 104 has the card connectors for its switch fabric cards located on one side and the card connectors for its line cards located on the other side, and may be more properly described as a midplane. Despite this, with forethought the backplane 104 itself, prior to insertion of card connectors, can be made identical to backplane 100.

As a final configuration example, FIG. 15 shows a side view of a router configuration 340 with up to four times the capacity of router 310. Router 340 combines the concepts of routers 320 and 330 by using line cards 342 with card connectors for up to four backplanes 100, 102, 104, and 106. Backplane 100 connects near the bottom of line cards 342, as in the previous examples. Backplane 102 connects near the top of line cards 342, as in router 320. Backplane 104 connects just above and slightly behind backplane 100 on line cards 342, as in router 330, and uses a midplane configuration with switch fabric cards facing backwards. Finally, a fourth backplane 106 is essentially a flipped version of backplane 104, like backplane 102 is a flipped version of backplane 100. Each backplane can hold up to N switch fabric cards, for a total switching capacity of 4N strands per port pipe. Thus with N=8, router 340 switches 32 strands-per-port-pipe as compared to the 8 strands-per-port-pipe of router 310.

Other variations on these configurations are possible. For example, all backplanes could be configured as midplanes with switch fabric cards facing opposite from line cards. And with additional stepped connectors and line card height, even more backplanes could be connected to a line card.

Figure 16:
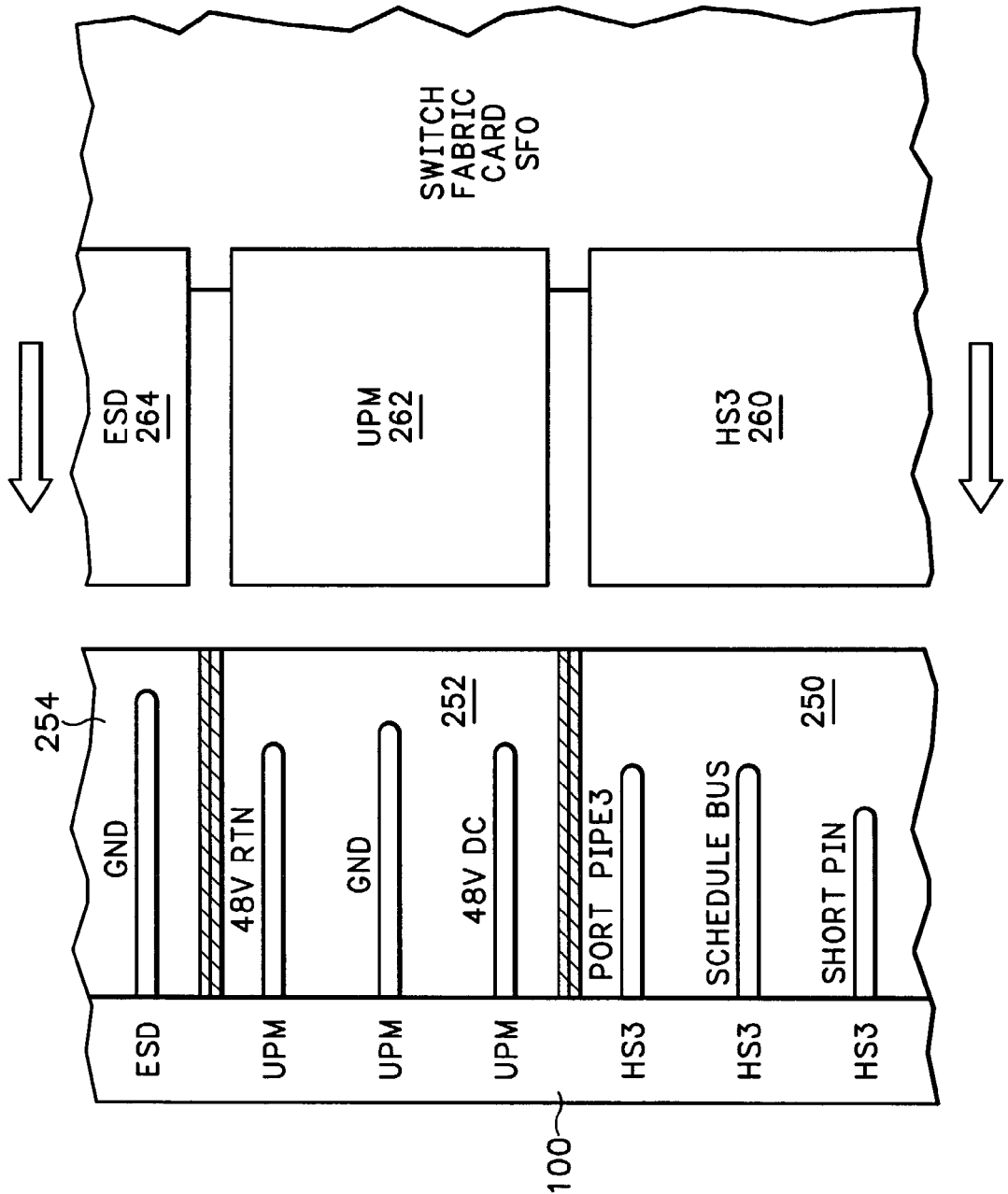
FIG. 16 shows a preferred pin-length distribution for electrically connecting switch fabric cards to a backplane, a distribution that allows notification that a card is being hot-swapped before packet data is lost.

FIG. 16 shows one additional aspect of the embodiments. In some embodiments, a "hot swap" capability exists where an operating switch fabric card can be taken out of service by removing it from an operating chassis. Although all preferred embodiments can sense that a switch fabric card has been removed and compensate by activating a standby card or reducing throughput to match the number of remaining fabric cards, FIG. 16 shows something more. The goal of FIG. 16 it to sense the impending removal of a card, and hopefully place that card on standby before any data loss occurs.

To this end, FIG. 16 shows a segment of a backplane 100 edge-on and a segment of a switch fabric card SF0 in side view, as they would be relatively positioned just prior to insertion of the card on the backplane. Backplane 100 has an ESD (ElectroStatic Discharge) socket 254 with a chassis ground pin, a UPM (Universal Power Module) socket 252 with ground pins and power supply pins, and an HS3 (High-Speed) socket 250 with port pipe pins, schedule bus pins, and a short pin. Switch fabric card SF0 has three connectors aligned with the three sockets on backplane 100: an ESD connector 264 aligned with ESD socket 254; a UPM connector 262 aligned with UPM socket 252; and an HS3 connector 260 aligned with HS3 socket 250.

Within the sockets, the pins are not of equal length. The ESD pin is the longest such that it makes contact first when the card is inserted into the backplane. This ensures that potential differences between backplane chassis ground and switch fabric card chassis ground can be equalized first. The next longest pins are the ground pins on the UPM sockets, followed by the 48V DC and return power pins, allowing power to be established next as the card is inserted into a chassis. As the card is inserted further, the port pipe, schedule bus, and other bus and signal pins (not shown) make contact. Finally, the short pin makes contact last, signaling that the card is fully inserted. On the switch fabric card, the short pin connection is tied through a pull-up resistor to logic high (not shown). Connection of the short pin thus notifies the RPM through a backplane connection that the switch fabric card is powered and ready to communicate.

When the switch fabric card is removed, the short pin breaks contact first. At this time, the remainder of the pins are still in contact, and the card can still function to switch data. Upon sensing the impending removal of the card, however, the RPM can schedule the next possible epoch without the strand served by SF0. As long as rescheduling can occur prior to disconnection of the port pipe pins, no packet loss will occur.

One of ordinary skill in the art will recognize that the concepts taught herein can be tailored to a particular application in many other advantageous ways, and that the specific numbers and configurations presented are merely exemplary and instructive. For instance, all epochs need not be of the same length or any particular length. A switch fabric need not be implemented in a single integrated circuit, and indeed, the number of channels, strands, connections, etc. served by a given circuit is a design choice. A strand can be a single serial differential pair, but can be anything else that makes sense to the designer: two differential pairs, an optical fiber, a number of single-ended electrical connections, etc. Circuitry other than that described will preferably reside on each card, and some such circuitry has been alluded to herein. As ways of implementing such circuitry will be evident to those skilled in the art upon reading this disclosure, and such circuitry does not directly impact the salient features of the present invention, detailed description of such circuitry has been largely omitted to prevent this disclosure from burgeoning into a production manual.

Several terms used herein should be considered in the context of a practical application rather than in absolute terms. For systems with line cards connected to backplanes, a backplane ingress or egress port is a "router core" port because it communicates packet data with the core switching functionality of the router. "Packet data" need not be recognizable as such in the router core; indeed, the preferred embodiments split consecutive packet bytes off to different core switches, such that no one core device can ever glimpse an entire packet data or payload. A "serial link" implies that the transmit clock is recovered from the data, but implies no other particular limitations. For instance, single-ended electrical paths, differential electrical paths, and optical paths can each be part of a serial link. And although many serial links transmit one bit-per-symbol, a given serial link could use more elaborate signaling. An "always-up" serial link is, of course, up when powered, enabled, and functioning normally. The term "port" is generally referred to herein in a functional sense—a given port in some embodiments is distributed among several devices or cards, and in some circumstances, such as a deserializer integrated with a digital switch fabric, the parallel "port" could be an internal interface within the circuit itself. A given switch fabric circuit could be served by more than one serial link per port, or data from one serial link could be distributed to multiple parallel switch fabric circuits. Although serdes devices are shown, nothing requires that a single circuit serve both serialization and deserialization functions. "Clocked" data is intended to be valid at a target device according to a separate transmitted clock.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of switching data packets through a router core serving multiple core ingress ports and multiple core egress ports, comprising:

queueing data packets at each ingress port in a set of egress queues, each queue in the set assigned to hold data packets having a corresponding core egress port assignment;

communicating egress queue status information, for each ingress port, to a central scheduler;

creating, based on the communicated egress queue status, a core ingress port-to-core egress port mapping for an upcoming epoch;

at the beginning of the epoch, reconfiguring the router core according to the core ingress port-to-core egress port mapping;

during the epoch, at each core ingress port that is part of the port mapping, supplying a group of packets to the router core, the group of packets selected from at least one egress queue having the same egress port assignment as that contained in the port mapping for that core ingress port; and for each group of supplied packets for a given epoch, switching that group of packets through the router core as a unit.

2. The method of claim 1, wherein queuing packets at an ingress port comprises holding data packets for multiple egress queues within the same physical memory space, and maintaining a set of pointers into that memory space to identify particular data packets with particular core egress port assignments.

3. The method of claim 1, further comprising assigning at least one of the egress queues to multiple core egress ports, for use in switching multicast data packets.

4. The method of claim 1, wherein communicating egress queue status information comprises, for a given ingress port, indicating which egress port assignments have data packets waiting to be scheduled through the router core.

5. The method of claim 4, wherein communicating egress queue status information further comprises, for a given ingress port, indicating a priority value for the egress port assignments having data packets waiting to be scheduled through the router core.

6. The method of claim 1, wherein the epoch is one in a sequence of epochs, each epoch in the sequence having its own core ingress port-to-core egress port mapping.

7. The method of claim 6, wherein all epochs in the sequence are of approximately equal length.

8. The method of claim 6, further comprising signaling the beginning of an epoch by sending a start-of-epoch signal to the router core and to the ingress ports, using point-to-point signaling lines of approximately equal delay.

9. The method of claim 6, further comprising communicating a given core ingress-port-to-core egress port mapping to the ingress ports at least one epoch prior to the beginning of the epoch associated with that port mapping.

10. The method of claim 9, further comprising, during a given epoch, filling a buffer with data packets to be supplied to the router core during the next epoch.

11. The method of claim 10, wherein multiple egress queues associated with an ingress port have the same core egress port assignment, wherein filling a buffer comprises transferring data packets from a first egress queue to the buffer, and when that queue empties before the buffer fills, continuing to fill the buffer with data packets from another egress queue having the same core egress port assignment as the first egress queue.

12. The method of claim 1, wherein switching a group of packets through the router core as a unit comprises subdividing the unit into multiple streams at the ingress port, sending each stream through a separate one of a plurality of router core switches, and recombining the multiple streams into the original unit at the egress port.

13. A packet routing device comprising:
   a switch fabric having a plurality of input ports and a plurality of output ports, the switch fabric capable of reconfiguration on an epoch-by-epoch basis to switch data according to an input port-to-output port mapping specified for each epoch;
   a plurality of router core egress ports, each paired with a corresponding switch fabric output port and capable of receiving data from that switch fabric output port;
   a plurality of router core ingress ports, each paired with a corresponding switch fabric input port and capable of transmitting data to that switch fabric input port;
   associated with each router core ingress port, a queue memory capable of supporting, for each of the router core egress ports, at least one corresponding egress-port-specific packet queue; and
   associated with each router core ingress port, means for directing multiple data packets from a selected egress-port-specific packet queue to the switch fabric during an epoch when the switch fabric is configured to switch data from that ingress port to the egress port associated with the selected egress-port-specific packet queue.

14. The packet routing device of claim 13, wherein the switch fabric comprises multiple parallel switch fabric cards, each serving one strand of each input port and each output port, wherein each input and output port is a multi-stranded port.

15. The packet routing device of claim 14, wherein each router core ingress port is a multi-stranded port capable of transmitting multiple data strands simultaneously, and wherein the associated means for directing multiple data packets comprises means for subdividing a multiple-data-packet unit into multiple data strands and supplying those strands in parallel to the associated multi-stranded port.

16. The packet routing device of claim 15, further comprising a strand sequencer to communicate to the router core ingress and egress ports, for a given epoch, the data strand associated with each port strand.

17. The packet routing device of claim 13, further comprising a scheduler to communicate port mapping instructions for each epoch to the switch fabric and to each of the means for directing multiple data packets.

18. The packet routing device of claim 17, further comprising a set of equal-delay start-of-epoch signal lines, each driven by the scheduler and connected to a receiver associated with a router core ingress and/or egress port.

19. The packet routing device of claim 17, further comprising queue status circuitry associated with each queue memory, and a scheduling bus linking the queue status circuitry associated with each queue memory to the scheduler, the queue status circuitry supplying queue status information to the scheduler across the scheduling bus.

20. The packet routing device of claim 13, wherein the means for directing multiple data packets comprises a transmit buffer capable of holding at least one epoch's worth of data packets and pre-fetch circuitry to direct data packets from the selected egress-port-specific packet queue to the transmit buffer prior to the start of the epoch during which those packets will be transmitted.

21. The packet routing device of claim 20, wherein the pre-fetch circuitry is capable of directing further data packets, from a second egress-port-specific packet queue, to the transmit buffer when the data packets in the selected packet queue do not comprise an epoch's worth of data packets.

22. The packet routing device of claim 13, wherein the queue memory is also capable of supporting packet queues corresponding to a multicast group of router egress ports.

23. A packet routing device comprising:
   a switch fabric having a plurality of input ports and a plurality of output ports, the switch fabric switching data according to a current input-port-to-output-port mapping;
   a scheduler to create switch fabric input-port-to-output-port mappings for epochs, each epoch having a length sufficient to allow a large plurality of maximum-transfer-unit packets to pass from a switch fabric input port to its mapped output port;
   a set of packet queues associated with each input port, each set of packet queues having at least one queue corresponding to each output port;
   means associated with each input port for sorting incoming packets into the associated set of packet queues, according to each packet's corresponding output port; and
   means associated with each input port for directing multiple packets from a selected packet queue to the switch fabric during an epoch when the switch fabric is configured to switch data from that input port to the output port associated with the selected packet queue.

* * * * *